(12) United States Patent
Sarkis et al.

(10) Patent No.: US 8,560,100 B2
(45) Date of Patent: Oct. 15, 2013

(54) COMBINATION MULTIMEDIA, BRAIN WAVE AND SUBLIMINAL AFFIRMATION MEDIA PLAYER AND RECORDER

(75) Inventors: George Sarkis, Orinda, CA (US); Gary DiGrazia, Jr., San Lorenzo, CA (US)

(73) Assignee: George Sarkis, Orinda, CA (US)

( * ) Notice: Subject to any disclaimer, the term of this patent is extended or adjusted under 35 U.S.C. 154(b) by 1072 days.

(21) Appl. No.: 12/551,655

(22) Filed: Sep. 1, 2009

(65) Prior Publication Data

US 2011/0054649 A1 Mar. 3, 2011

(51) Int. Cl.
*G06F 17/00* (2006.01)

(52) U.S. Cl.
USPC ................................ 700/94; 434/319; 600/28

(58) Field of Classification Search
USPC ................................ 700/94; 434/319; 600/28
See application file for complete search history.

(56) References Cited

U.S. PATENT DOCUMENTS

| | | | |
|---|---|---|---|
| 3,882,850 A | 5/1975 | Bailin et al. | |
| 4,008,714 A | 2/1977 | Silva et al. | |
| 4,395,600 A | 7/1983 | Lunday et al. | |
| 4,777,529 A | 10/1988 | Schultz et al. | |
| 5,076,281 A | 12/1991 | Gavish | |
| 5,170,381 A | 12/1992 | Taylor et al. | |
| 5,215,468 A | 6/1993 | Lauffer et al. | |
| 5,245,666 A | 9/1993 | Mikell | |
| 5,667,470 A | 9/1997 | Janata | |
| 5,740,812 A | 4/1998 | Cowan | |
| 5,892,440 A | 4/1999 | Bryan | |
| RE36,348 E | 10/1999 | Carter et al. | |
| 6,084,516 A | 7/2000 | Yasushi et al. | |
| 6,978,179 B1 | 12/2005 | Flagg et al. | |
| 7,081,085 B2 | 7/2006 | Viirre et al. | |
| 7,674,224 B2 * | 3/2010 | Hewett | 600/28 |
| 7,717,842 B2 * | 5/2010 | Kwon et al. | 600/28 |
| 2003/0171688 A1 | 9/2003 | Yoo et al. | |
| 2004/0097824 A1 | 5/2004 | Kageyama | |
| 2006/0116600 A1 | 6/2006 | Vesely et al. | |
| 2006/0167376 A1 | 7/2006 | Viirre et al. | |
| 2007/0084473 A1 | 4/2007 | Hewett | |
| 2008/0092182 A1 | 4/2008 | Conant | |
| 2008/0101621 A1 | 5/2008 | Zimmerman | |
| 2010/0056854 A1 * | 3/2010 | Chang | 600/28 |
| 2011/0060436 A1 * | 3/2011 | Gandini | 700/94 |

OTHER PUBLICATIONS http://www.phrases.org.uk/meanings/cognito-ergo-sum.html "The Phrase Finder" (Undated).

(Continued)

*Primary Examiner* — Joseph Saunders, Jr.
(74) *Attorney, Agent, or Firm* — Dennis F. Armijo

(57) ABSTRACT

System, method, and application to integrate a web browser and/or search engine with multiple media players-recorders into an Internet web virtual application, which a user can use to control features such as, file browsing, media recording, file creation, editing, sequencing and storing and/or file sharing. A user can select, organize, record and manage information/data/content as multimedia files or media files (MMF), create user defined media libraries to store MMF, select or create brain wave patterns, organize and make a secure personal affirmations, harmonize and blend brain wave patterns with personal affirmations a single secure subliminal file and stored in a library, select one or more MMF from playlists to be synchronized with one or more secure subliminal affirmation tracks as separate and parallel synchronized media files. The synchronized MMF and the secure affirmation track can be saved as separate but parallel media files in user defined media playlists, for parallel playback on analog or digital devices.

20 Claims, 13 Drawing Sheets

(56) References Cited

OTHER PUBLICATIONS http://www.publicbookshelf.com/public_html/Outline_of_Great_Books_Volume_I/think . . . "Rene Decartes: I think therefore I am"—Decartes—from Discourse on Method (Undated).
http://www.eoht.info/page/Ernst+Br%C3%BCcke "Ernst Brucke"—Encyclopedia of Humanthermodynamics (Undated).
http://www.eoht.info/page/Hermann+Helmholtz "Hermann Helmholtz"—Encyclopedia of Humanthermodynamics (Undated).
http://www.eoht.info/page/Psychodynamics "Psychodynamics"—Encyclopedia of Humanthermodynamics (Undated).
http://www.humanthermodynamics.com/Freud.html "Freud's Psycho Dynamic Theory and Thermodynamics" [1873-1923].
http://psychclassics.asu.edu/James/Principles/index.htm "Classics in the History of Psychology"—an internet resource developed by Christopher D. Green, York University, Toranto, Ontario/The Principles of Psychology by William James (1890).
Gestalt Psychology by Dr. C. George Boeree, Copyright 2000.
Gestalt Theory by Max Wertheimer (1924) (1st part).
Brain, from Wikipedia, the free encyclopedia—re: Shepherd, Gordon see footnotes 1&8 (undated).
Excerpt from the Brain Plasticity Revolution (Chapter 3) The Brain that changes itself. By Norman Doidge, MD/448 pages/Viking 2007/ by Carol Marham, Ph.D. P.T. and William Z. Rymer, MD, Ph.D.
http://www.alleninstitute.org/science/public_resources/atlases/human_atlas.html Allen Institute for Brain Science Allen Human Brain Atlas (Undated).
Excerpt from "The Critical Moments Project", by George Woods, MD (Undated).
Excerpt from "Musicophilia", Tales of Music and the Brain by Oliver Sacks First Vintage Books Edition, Sep. 2008.
Excerpt from "This is your brain on Music", the Science of a Human Obsession, by Daniel J. Levitin (Undated).
A Scripture excerpt—A Thinking, Feeling & Doing by Edward Wheeler Scripture, Ph.D. (Leipzig) 1895.
Scripture Excerpt—B, Thinking, Feeling & Doing, Chapter IV. Think-Time (Undated).
http://www.selfgrowth.com/print/580445 SelfGrowth.com The online self improvement encyclopedia Definition: Subliminal Messages/By Wikipedia.org, Nov. 12, 2008.
http://www.biocybernaut.com/about/brainwaves/EEG.htm EEG—ElectroEncephaloGraph or ElectroEncephaloGram The Biocybernaut Institute—About/Brain Waves/EEG (Undated).
http://www.bio-medical.com/news_display.dfm?mode=EEG&newsid=5 Article section—EEG or Electroencephalography (Undated).
Excerpt from "Failure to Detect Displacement of the Visual World During Saccadic Eye Movements" by Bruce Bridgeman, et al., Vision Res. vol. 15, pp. 719-722: Pergamon Press 1975, Printed in Great Britain.
Excerpts from "The Psychology of Social Norms" by Muzafer Sherif, with an introduction by Gardner Murphy Harper & Brothers Publishers New York and London 1936.
Excerpts from "Classics in the History of Psychology" An internet resource developed by Christopher D. Green, York University, Toronto, Ontario From http://psychclassics.asu.edu/Sherif/Chap1.htm#note6 Intergroup Conflict and Cooperation: The Robbers Cave Experiment by Musafer Sherif, et al., (1954/1961).
Excerpt from the University of Oklahoma Graduate College Research Technique in Small Group Studies/ A Thesis submitted to the graduate faculty in partial fulfillment of the requirement for the degree of Master of Arts by George Sarkis, Norman, OK 1964.
Self Mastery through Conscious Autosuggestion by Emile Coue/ American Library Service/Copyright 1922.

* cited by examiner

COMBINATION MULTIMEDIA, BRAIN WAVE AND SUBLIMINAL AFFIRMATION MEDIA PLAYER AND RECORDER

BACKGROUND OF THE INVENTION

1. Field of the Invention (Technical Field)

The presently claimed invention relates to multimedia players/recorders and more particularly to a method system and computer program product for an individual to create a personalized multimedia player/recorders, preferably web based, that contains a combination of multimedia, brain waves and subliminal affirmations.

2. Background Art

The presently claimed invention will have applications in many aspects of critical thinking in daily life situations that are learned through education and/or training and lead to personal development/enhancement, personal performance and personal health (both mental and physical). The presently claimed invention draws on advancements from many fields such as, psychology, neuroscience, computer technology, and communications. For example, the $20^{th}$ century marked a change from $17^{th}$ century theory by Rene Descartes of the dualism that the mind and brain are two entirely separate things. Descartes regarded the senses and perception as unreliable. For Descartes, cognition was rational deduction by the mind. He encapsulated rationalism as, cogito ergo sum or, "I think, therefore I am."

In the late $19^{th}$ century, philosophy and science came to view the rational mind and functional brain intertwined as two parts of the same thing. This gave rise to the social sciences which sought to move the study of human behavior from descriptive commentary to a scientific approach. In 1874, the German physiologist Ernst von Brucke and the physicist Hermann von Helmholtz published "*Lectures on Physiology*" which set forth the radical concept of "psycho-dynamics." This held that all living organisms are dynamic energy systems to which the laws of chemistry and physics apply. This became the basis for Sigmund Freud's dynamic psychology of the mind and the unconscious. The work of von Helmholtz influenced William James who had spent time in Germany. James earned a medical degree from Harvard Medical School, but became a professor of philosophy and experimental psychology at Harvard University. James' voluminous writings on human psychology included his theory of emotions which held that emotions are the mind's perception of physiological conditions such as, eye flutter, sweaty palms, tense muscles, racing heart, etc., and result from some stimulus that can be measured or assessed. James also wrote about cognition and the concept of stream of consciousness or the range of thoughts when a person becomes aware of, as they process information.

The basic characteristic of the human brain is information processing over an individual's lifecycle. The fundamental problem confronting the study of cognition in human sensory information processing and its affects on psycho-social learning is the seemingly haphazard way in which the brain learns to perceive, process, organize, store, and recall thoughts and memories. This fundamental problem is made more complex when considering when and which of the five senses first detects the sensory stimuli, as information and, how the brain's internal information processing mechanisms "inner-actively" links to cognition, perception, learning and performance. Studies in neuro science now indicate that the sum total of thoughts, memories and experience is represented in the brain by patterns of synaptic firings, as biochemical and electromechanical activity. Psychological studies now teach a holistic view of the mind and brain which is now ingrained in the English language as the Gestalt view, "The whole is different from the sum of the parts."

In application, personal development is thought to be an "inner-active" sequence which begins with cognitive differentiation of random bits of modal stimuli and some form of mental cuing to heighten alertness as a precursor to a series of perceptual steps such as, pattern awareness, adaptation and organizing sensory information as thought to reinforce learning that leads to understanding. Research about the brain's ability to adapt, change and learn cross-cuts many fields of research. Gordon M. Shepard, M.D., Ph.D. and professor of neurobiology and neuroscience, teaches the brain it is the most complex biological structure known. Initially, $20^{th}$ century researchers taught a "fixed-brain concept" where the brain's ability to adapt, change, organize and learn was limited to critical childhood periods, and mental decline was the inevitable result of aging. In the 1980s', neuro-scientists had a eureka moment. This was the result of a series of surgical experiments to sever and physically swap nerve connections between a monkey's different fingers and their corresponding sensory cortexes in the brain. The surgically altered monkey brains quickly recognized the swap and learned to adapt and re-organize the surgically reconfigured neural connections. To describe the brain's vast capability to constantly change, adapt and re-organize neural functions at almost any age, research professor, Michael Merzenich, M.D., coined the term "neuroplasticity." He also noted that neuroplasticity is a two-way street, as it can be either positive or negative. In vertebrates, the brain is the center of the nervous system and, among other things, it controls behavior. Little is known about how such a complex structure is formed from a basic four letter genetic code or how the right neuron or group of neurons connect in the tangled neural network to switch on at the exact right place at the exact right time. Scientists at the Allen Institute for Brain Science are trying to map the uncharted mystery of brain function at the level of specific genes and synaptic connections among individual neurons to develop theories about how the brain is formed and how it works. For reasons not yet understood, memories tend to overlap, combine or distort, as details disappear. By comparison, a computer stores each detail as bits of information at a specific location, from which it can be recalled almost instantly. Neuroscience research indicates that the human brain does not use a computer's fixed-address system. Rather, the human brain is not location addressable, but it is content-dependent, so recall is content-filtered. Thought and memory are also a reflection of emotion, personality, perception, effort and practice. Every time a person consciously or sub-consciously thinks, learns or repeats something, it connects to something else and reinforces association, memory, and recall. Cognitive psychologists term this "elaborative encoding" while psychiatrists and neuro-scientists term this "active participation."

George Woods, M.D. and professor of neuro-psychiatry, has elaborated on the theory that active participation, learning, and personal development can be inhibited at an early age by a critical psychological event or social circumstance that affects critical judgment or self-esteem. Professor Woods teaches an "inner-active" or critical event or circumstance can subliminally inhibit one's attitude to participate, learn and overcome low self-esteem. He also teaches that critical inhibitions can subsequently be recalled and verbalized in a favorable group setting of like-inhibited-peers which he terms, as "Critical Moments." Dr. Woods teaches active participation with similar-inhibited-peers can relieve self imposed subliminal "inner-active" inhibition to learning and personal development. Professor Woods teaches that most if not all of us, at times, face our own critical moments and; by verbalizing our own critical moments in a group setting each individual can come face-to-face with others who also have experienced self inhibition or low self-esteem that affects learning and personal development. Professor Woods teaches that if unrelieved, low self-esteem and inhibition can foster psychological resistance to "inner-active" expectation, suggestion, external stimulation, association and ultimately imagination. Absent the relief, the prospect of active participation is replaced with complacency or self-loathing. However, he has noted that music is a tool for arousing emotions needed for social bonding and this inspires active participation or what is colloquially termed "turned-on" and "tuned-in".

Musicologists and neuroscientists, Oliver Sacks, M.D., and Daniel Levitin, PhD., teach that expectation and suggestion can greatly enhance musical imagery. In his writings, Dr. Sacks, a neurological researcher, cites studies by Alvaro Pascual-Leone, M.D., PhD. a researcher of non-invasive brain stimulation. Dr. Leone's study of regional cerebral blood flow in musical performance found that, "the combination of mental stimulation and physical practice leads to greater performance improvement than physical practice alone, a phenomenon for which our finding provides a physiological explanation." Dr. Levitin, a researcher of cognitive perception, teaches that thoughts and memories arise from the myriad connections among neurons, but not all neurons are equally active at one time. And, certain groups of neurons or networks of neurons become active during certain cognitive activities. In turn, they can turn on other neurons within the tangled neural network. Listening, playing, writing or imagining music involves nearly every region and neural subsystem of the brain. These activities begin at the sub-cortical level and move to the auditory cortices on both sides of the brain. In effect, the sub-cortical level cues the brain into a state of awareness to begin discerning, recalling and processing familiar things such as, the beat, melody and words. He also notes that music cross-cuts historical time and cultures.

In 1895, E. W. Scripture, PhD (and later M.D.) a professor of experimental psychology at Yale University published the book "*Thinking, Feeling and Doing*" about quantitative studies of time and action in human behavior. He was a pioneer in developing devices to quantify and measure anticipation and reaction time, thinking time and attention. This book was the basis for a paper he titled, "*Principles of Subliminal Messages*" published in The New Psychology, 1898. The term "subliminal" comes from the Latin words sub and limen and translates into "below the sensory threshold." Dr. Scripture taught that a subliminal message or signal could be embedded in another medium, auditory or visual, so it was possible to subliminally stimulate the unconscious mind before it was consciously discerned or perceived. During World War II, a device called tachistoscope was developed to quickly flash images to train fighter pilots to reduce the reaction time needed to recognize enemy planes. Today, tachistoscopes are used to test sight and increase reading speed. Subliminal stimulation was used as a hidden marketing tool to suggest familiarity with products in music commercials and TV commercials. This prompted Congressional investigations. In the interest of protecting the public airwaves from being used to deliver hidden subliminal messages in commercials, the Federal Communications Commission issued a public policy statement that hidden subliminal advertising to the general public was contrary to public interest, as it was intended to be deceptive. Hidden subliminal advertising to the public was also banned in Canada. However, regulatory pronouncements do not prohibit self-directed audio or video subliminal stimulation.

The observation of electrical activity in the exposed brain of animals was reported by Dr. Richard Caton in the British Medical Journal, in 1875. Measurement of electrical activity in the human brain is credited to the physiologist and psychiatrist, Hans Berger. In 1924, Professor Berger used an electroencephalograph (EEG) to begin the first systematic study of electrical activity in the human brain. Professor Berger was also the first to describe different brain wave activity or rhythm cycles such as, alpha and beta states of mind. These delineate the frequency range of brain wave activity during the alpha period of waking relaxation with the eyes closed which occurs in the range of 8 to 12 Hertz. The beta state is associated with the normal awake conscious state and is delineated into three frequency ranges: 1) low beta 12 to 15 Hz; 2) beta waves of 15 to 18 Hz; and 3) High beta of 19+ Hz. It is believed that access to the subconscious mind is through alpha brain waves. Subsequent researchers identified other brain wave states that include the theta state in the frequency range of 3 to 6 Hz. The theta state correlates with an alert state of mind associated with voluntary behavior such as, enhancing performance in learning new things and also memory recall. The presently claimed invention uses a brain wave generator to enable the end user to select the desired brain wave frequency.

In addition to using frequency ranges to measure brain wave activity, frequency ranges are used to measure saccadic eye movement. This is the quick simultaneous movement of both eyes in the same direction which is initiated in frontal and parietal lobes of the brain. The human eye is in a constant state of movement as it oscillates back and forth in the range of 30 to 70 Hz. Although, saccadic eye movement is usually associated with the waking or conscious state, saccadic eye movement has also been observed in subconscious and unconscious states, such as REM or deep sleep state; in memory guided states where there is no visual stimulus and; in psychiatric disorders like ADHD, epilepsy, dyslexia, and intoxication.

Saccadic eye movement affects visual perception and the ability to interpret information from visible light reaching the eye. Both saccade and visual perception are affected by their surrounding environment characterized by two phenomena known as saccadic suppression of image displacement (SSID) and; the autokinetic effect. Bridgemen, et al., described SSID as perceptual selectivity or saccadic masking to block many useful pieces of information in viewing changes in the location of objects to prevent blurring when the eyes blink. In an attempt to minimize sensory overload, the brain does not process every detail that the eyes see. Rather, the brain takes a thin slice or a neurological shortcut to form a mental picture of what things should look like. The brain's efficiency is often taken for granted as reality seems simple i.e., we just open our eyes and it is there. The link between the brain's efficiency and cognitive illusion is not so simple, but it can provide insights into brain function in relation to sensory overload.

Conversely, another type of cognitive illusion in visual perception occurs when the surrounding environment is featureless and sensory information is lacking. This is known as the autokinetic effect. This effect is easily observable in the heavens by looking at a bright star which is stationary, then, suddenly the star will appear to move. In the 1950s', Muzafer Sherif, PhD, conducted a series of clinical experiments and field studies of the autokinetic effect on social factors in perception, which are considered seminal in the field of Social Psychology. Professor Sherif overwhelmingly demonstrated that visual perception of a stationery pin point of light could be altered by both overt and covert suggestions about its movement. And, susceptibility to suggestion can occur even when the subject is aware that the suggestion is illusory. The psychological implications of Sherifs studies indicate that deep seated attitudes and consequent behavior can be altered by either overt or covert suggestions by others.

In 1920, Emile Coue, a pharmacist, was the first to write about the placebo effect in his book, "*Self-Mastery Through Conscious Autosuggestion*". Coue observed that he could assist patients to recover from illness more quickly. When prescribing a given medicine Coue would praise the effectiveness of the medicine to some patients, but not to others. He observed the patients to whom he had praised the medicine had a marked improvement, as compared to those to whom he said nothing. Consequently, Coue developed and taught a method for autosuggestion to assist patients to recover more quickly by replacing negative thoughts of illness by cueing them with new positive thoughts about medicine and wellness. Coue's teaching of autosuggestion was based on the principle that any idea exclusively occupying the mind can become reality, if the idea is perceived to be within the realm of possibility. Coue's methodology relied on repeating words or images enough times to cue the subconscious to absorb the positive autosuggestion to the exclusion of one's own will power.

The prior art includes a number of approaches to develop an effective means, including auditory means, to subliminally stimulate the individual user's desire to enhance learning or performance through technology. An individual users need for such means is widely recognized. It is believed that a key reason for lack of acceptance of the prior art is that these approaches teach technical innovation as stand-alone-devices which are controlled, administered or supervised by someone other than the individual user or patient.

Some of the prior art may include an apparatus, instrument or electrical circuit as part of the stand-alone-innovation. These devices and methods are not designed to connect to a virtual system platform as on-line methods and applications. Examples of these prior standalone devices include, U.S. Pat. No. 3,882,850; U.S. Pat. No. 4,008,714; U.S. Pat. No. 4,395, 600; U.S. Pat. No. 4,777,529; U.S. Pat. No. 5,076,281; U.S. Pat. No. 5,170,381; U.S. Pat. No. 5,215,468; U.S. Pat. No. 5,245,666, and; Patent Application Publication No. US 2008/ 0101621 A1. Some prior art of stand-alone-innovations may include the use of a computer, sensor, software, network or wireless means and/or an electrical circuit. The stand-alone-innovations are configured to operate off-line rather then being configured to operate as an on-line web based virtual application controlled by the individual subject via the Internet. Examples of these include, U.S. Pat. No. 5,667,470; U.S. Pat. No. 5,740,812; U.S. Pat. No. 5,892,440; U.S. Pat. No. 6,084,516; U.S. Pat. No. 6,978,179 B1; U.S. Pat. No. 7,081, 085 B2 and; U.S. Pat. No. Re. 36,348. Also included respectively herein are: U.S. Patent Application Publication No. U.S. 2003/0171688 A1; U.S. Patent Application Publication No. 2004/0097824 A1; U.S. Patent Application Publication No. U.S. 2006/0116600; U.S. Patent Application Publication No. U.S. 2006/0167376 A1; and U.S. Patent Application Publication No. US 2007/0084473 A1.

U.S. Patent Application Publication No. US 2008/0092182 A1, is a system, method, and apparatus for a single source network that connects to the Internet to search and select certain commercial and non-commercial multimedia content, which single source then downloads to the client end user in return for fees from both the client end user and from commercial content sources. The single source network has value in automating content searches of commercial and non-commercial multimedia sources and matches the content to meet end user profiles and disclosed preferences. However, this is a master/slave computing model that requires the end user to cede control of connecting directly to the Internet in return for the convenience of content searches by the single network source. This contrasts with the Internet model of an open source medium to exchange information. If the client end user must cede control of access to the Internet, it can have a cascade affect and render the single source's network architecture less efficient, as it scales. Ceding control also raises the risk of the end user being automatically pigeonholed as to the content selected and downloaded. The single source's on-line ability to gather the client end user's personal information and customer behavior is based on a business model to generate revenue sharing opportunities which can be divvied up with commercial content providers and advertisers. This model raises the prospect of privacy conflicts, privacy violations, and censorship, as no client end user security or privacy safeguards are made part of US Patent Application Publication No. 2008/0092182.

As of this writing, none of the prior art provides the individual user with open access to an online, virtual, interoperable and interactive means to connect and control, a ubiquitous technology platform, via the Internet. Nor does the prior art enable the individual user to exercise, on-the-fly productive means to search, select, organize, store and recall information multimedia files (MMF), which are of interest to that user. Another key reason is that prior art, as stand-alone-innovation, does not solve the client end user's requirements of being practical, easy to use, economical and secure with respect to personal privacy. None of the prior art provides an open bi-directional online pathway to connect directly via a web browser to ever growing resource nodes on the Internet. Nor, do they offer a direct connection to a user-controlled web application that provides the means to both stimulate one's desire to participate and the brain's ability to learn by using personalized MMF to enhance the process of education and personal development that is easy-to-use, flexible, cost effective and relevant for the client end user and researchers.

SUMMARY OF THE INVENTION

Disclosure of the Invention

Connecting directly to an online virtual system platform via web browser devices enables client end user's to control and "inner-actively" stimulate their desire to participate in learning to enhance personal development is due, in part, to the recent emergence of the Internet as an open access communications medium to a common global network of world wide resource node web sites. Along with the emergence of new functional digital technologies comes the issue of making the technology useful.

It is one object of the presently claimed invention to provide an interactive, efficient easy-to-use, cost-effective system, method and means to integrate multiple media player/recorders that the client end user can access via a web browser device to control the usefulness of the presently claimed invention's technology platform.

Another object of the presently claimed invention is to provide the client end user with the productive and interactive means to control the search, selection, manipulation, mash-up, organization, harmonizing and blending, synchronizing, storing and recall information (MMF) which is of interest to that user.

Another object of the presently claimed invention is to provide the client end user with the means to control and elevate one's desire to "inner-actively" stimulate their brain's receptivity to certain cues in order to reach an optimal state of awareness and sharpen mental focus.

Another object of the presently claimed invention is to enable the user to tap directly into their brain's pleasure centers to reward and reinforce the learning of material that matters to the individual user and; to demonstrate an understanding of the material by enabling the end user to track their own personal development towards peak performance.

It is yet another object of the presently claimed invention to provide an effective means to insure client end user privacy and to prevent their personal information, inputs and preferences from being leaked, disclosed or sold to marketers or commercial enterprises; or, give them choice and control to disclose that information to others in their social network.

Another object of the presently claimed invention is to provide the client end user with the means to create or input their own MMFs and integrate these with other MMFs found on the Internet or pre-defined by the presently claimed innovation.

A further objective is to enable the client end user to provide a means to display user selected MMFs as text or graphics.

Another object of the presently claimed invention supports the use of a Mindjamz (MJZ) Wizard designed for mobile devices.

Other objects of the presently claimed invention including its utility in medical research will become clear upon a reading of the following specification.

Several innovative functions of the presently claimed invention will help enhance utility of the disclosed MJZ innovation. These functions relate to effectiveness and capabilities to easily tailor the presently claimed invention to meet the specialized needs of client end users who may have different individual mental capabilities or certain impairments which may be physical or psychological. In its primary embodiment, the on-line application is not installed on the end user's computer or web browser device. The application is connected to the user's web enabled computer or web browser device and appears virtually as an on-screen display, commonly called a user interface. The user interface is designed to give the client end user the means to control and seamlessly search, import, edit, harmonize, blend, synchronize, identify, store, recall and playback different types of MMFs without modifying the content or erase their browser device settings, files or applications. In alternative embodiments, MJZ supports a Karaoke capability while the MJZ wizard supports mobile devices. All embodiments of the presently claimed invention enable the client end user to search, recall and playback different types of MMFs without modifying the content or erasing device settings, files or applications. The presently claimed invention provides the client end user with the means to control and/or elevate their desire: to "inner-actively" stimulate their brain's capability to receive cues to optimize a heightened state of awareness necessary to sharpen their mental focus to learn relevant material selected by the user, and to reinforce this training or learning process in order to achieve a level of understanding, by providing a means to track one's own personal development and optimize peak performance.

Multiple embodiments of the presently claimed invention are possible and user controlled. Each embodiment can comprise combinations of all or some of the functional task modules and their respective functional task elements illustrated in FIG. 1 titled "Overview of System Platform, Application and User Interface." FIG. 1 depicts an interoperable system platform whose functional task modules integrate user stacks of software and subsystems to deliver a complete and integrated application solution, as a user friendly service or product. The system platform is a web site resource node which resides on the Internet's global communication network of networks, and is accessed by the client end user's computer web browser or web browser device. The system platform resource node has its own Uniform Resource Locator ("URL"). The URL provides MJZ's Internet protocol address which numerically specifies where the system platform's resource node is located (hosted) on a web server and how this URL's can be accessed. Locating or hosting MJZ's system platform application on a web server provides the end user computer or web browser with an online display of its simulated online environment. The simulation is a virtual display of the interface of a fully operable application which the end user can control from their web enabled computer or web browser device. When accessed via the Internet by the end user's web enabled computer or web browser device the application's virtual interface, as depicted in FIG. 1, hides the physical characteristics of the system platform's computing resources and eliminates the need to download the actual system platform and the application's resources to the end user's computer or web browser device. By virtualization the interface of the system platform application, MJZ provides the end user with a fully integrated on-line solution known to those skilled in the art as, "cloud computing" or "cloudware". To those skilled in the art, the "cloud" is a metaphor for a Web hosted complex technical infrastructure with expertise it conceals and the functions is supports.

Cloud computing is dynamically scalable and minimizes the end user's need for additional hardware and software. All upgrades are made at system platform level and not on the end user's desktop. This type of computing also minimizes the end user's need for technical expertise to control the cloudware by concealing the technical details of the computing hardware and software infrastructure which is built it into the cloudware to support the integrated application functions, such as searching, selecting, organizing, storing MMFs from media browsers, media players, media recorders, harmonizers, blenders, synchronizers, voice recognition, speech to text and parallel record and playback. In contrast, other types of stand alone media players such as, Quicktime®, iTunes®, Microsoft® Media Player, Adobe® Media Player, BS Player®, XMMS® and Zune® are software applets which the end user must install on their desktop and create a shortcut icon. Some of these software applets may only playback audio files, but not video files or vice versa while a few will playback both audio and video MMFs. Whatever type of stand alone media player is used, each is only compatible with specific software operating systems so they are not interoperable or integrated to perform additional functions such as, recording, harmonizing, blending and synchronizing MMFs for parallel playback without modifying the content or changing device settings. None of these stand alone media players embody all of the functions, integration and interoperability of the presently claimed invention. The end user would have to use several different stand alone applets, as well as developing a method or algorithm of technical expertise required to make the output of each of these stand alone applets working together.

The presently claimed invention draws from multiple fields of art which includes the Internet, a system platform, a concealed expert method and a web based online application, web browsers, analog and digital multimedia files, brainwave frequency patterns, affirmations, neuro-science, education, training, learning and personal development/enhancement. The presently claimed invention embodies a system platform, method and integrated resource node appearing as a virtual online web application that is Internet accessible via an end user defined web browser. Web browser device access via the Internet allows a client end user to control the interoperable MJZ web-based technology in the form of a integrated system platform, which seamlessly integrates and nests the end user's web browser and/or search engine to select, organize and manage information that is retrieved and imported from multiple fields of art in order to be edited, created, recorded, harmonized, blended, synchronized and secured for storage/ saved as a Mindjamz*. The asterisk symbol (*) will only appear after a synchronized Mindjamz* is stored/saved in a playlist which may also store other un-synchronized MMFs or tracks. The asterisk symbol after Mindjamz* also denotes that it is relevant to the end user when stored in user defined digital library playlists for playback (download) to or from wired, wireless or mobile devices for private and personal development/enhancement. A Mindjamz* can also be visually identified by a bolded border box around the media art work appearing in the video player and text display, as illustrated in FIG. 3

In the preferred embodiment illustrated in FIGS. 1 and 2 there are a total of 18 function modules. FIG. 3 illustrates the operation of the function modules as sequential steps 1 to 10 in order to create a Mindjamz* end product/service which, in FIG. 3, is the audio MMF titled as Ravel . Sequential use of the functional modules is not required, as use of any function module can occur in any order determined by the end user. FIGS. 4 through 11 are illustrations of the various functional elements found in FIG. 1 which the end user can control to search, select and develop MMFs, which are important to them. As to functional elements, they are subsets of their respective function modules and, the functional elements will appear in italic fonts in the following text. FIG. 10 illustrates the creation of a Mindjamz* audio-video MMF titled Golf Swing . FIG. 11 illustrates two Karaoke shortcut functions. FIG. 12 illustrates the MJZ wizard for connecting web enabled mobile browser devices such as, three of the more popular mobile devices. FIG. 13 illustrates how an end user opens an MJZ account or logs-on and defines their desired level of security and privacy. It should be noted that FIGS. 4 to 11 each illustrate a partial static view rather than a dynamic online example of what would occur within the entire virtual application when the end user executes an online input. In some examples, references to more than one figure are required to discuss the executable online dynamics of user inputs.

Other objects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the presently claimed invention. The objects and advantages of the presently claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the presently claimed invention and, together with the description, serve to explain the principles of the presently claimed invention. The drawings are only for the purpose of illustrating a preferred embodiment of the presently claimed invention and are not to be construed as limiting the presently claimed invention. In the drawings:

DESCRIPTION OF THE PREFERRED EMBODIMENTS

Figure 1:
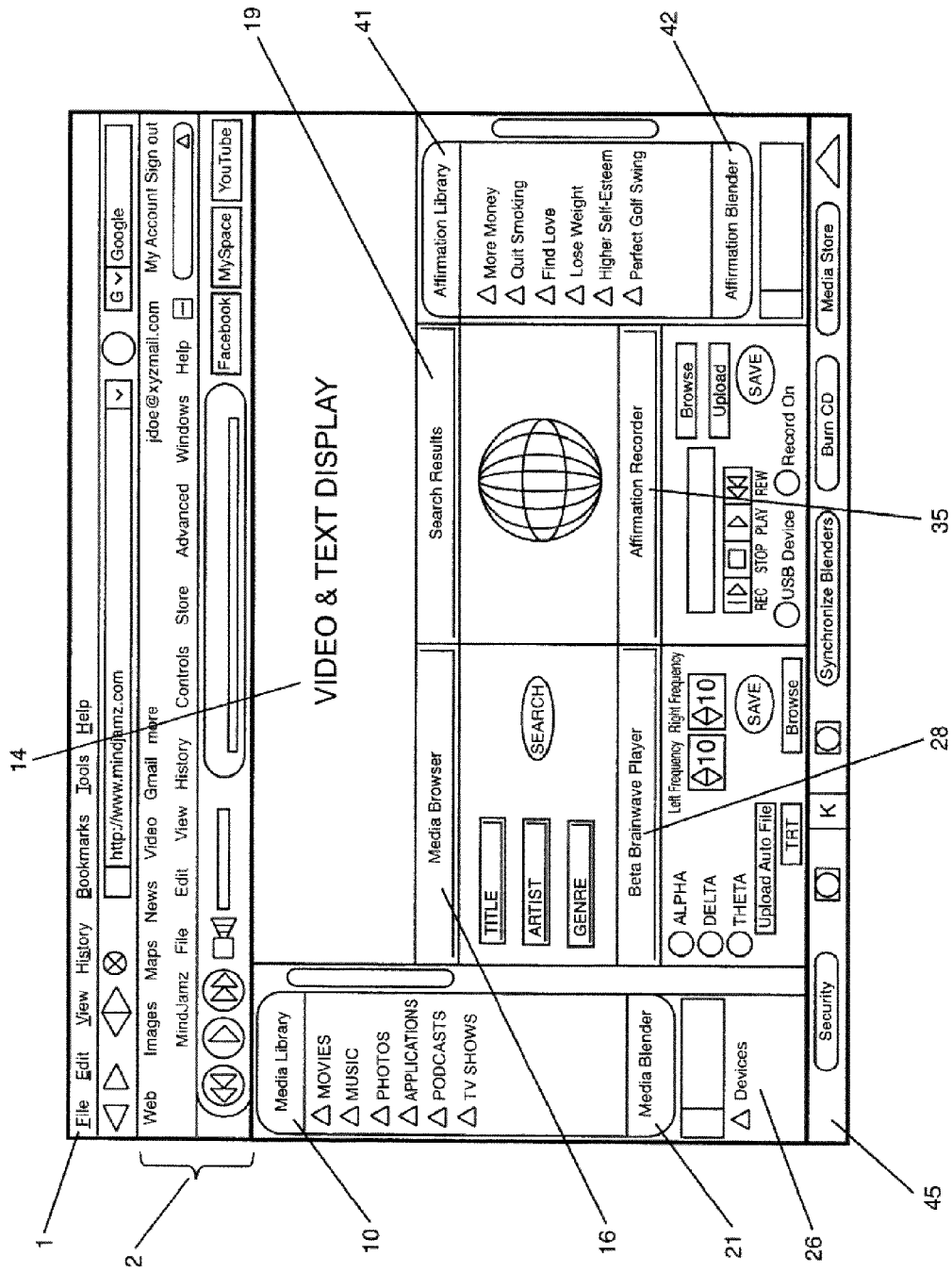
FIG. 1 is a screenshot with an overview of the system platform, application and user interface.

Best Modes for Carrying Out the Presently Claimed Invention

The presently claimed invention integrates an online system platform, method and application with flexible function task modules which can be controlled by the end user. These are accessed by an end user via a web enabled computer or web browser device. These modules are interoperable with other web enabled computers and web browser devices to exchange data over the Internet. The end user can control, select and operate each, or all or any combination of the modules which appear on the end user's web enabled computer or browser device, as a virtual interface of the system platform application's function task modules and their respective functional task elements.

The word "exemplary" is used herein to mean "serving as an example, instance, or illustration." Any embodiment described herein as "exemplary" is not necessarily to be construed as preferred or advantageous over other embodiments.

The criteria for system interoperability refers to the capability of the system platform's software programs and program subsets to control the transfer of data via a common set of exchange formats to read and write the same files, and to use the same standards and protocols to facilitate network connections to communicate data exchange between networked computing endpoints. The criteria for system integration refers the linkage between and among the individual function task module(s), with their respective subset(s), so each are operationally compatible within the system platform as a integrated application. Each of the following presents one or more of the presently claimed invention's embodiments which are possible. For example, the flexible functional task modules can refer to the operation of each individual functional task module which can be executed independent of the other functional task modules, as controlled by the end user.

Or, the operation embodies the flexibility to execute a combination of one or more of the other individual functional modules, as controlled by the end user. And/or the embodiment's operation can be executed in conjunction with all of the functional task modules, as controlled by the end user. All the embodiments of the presently claimed invention are accessed and controlled by the end user via a web enabled computer or web browser device. And the presently claimed invention's embodiments, which are hosted and displayed online as a virtual interface, are known by those skilled in the art, as "cloud computing or cloudware" since neither the system platform or the application function modules are not downloaded nor, do they reside on the end user's web enabled computer or browser device. To reiterate the emerging technical art of web hosted technology, the "cloud" is a metaphor for the complex technical infrastructure and the expertise it conceals and the functions it supports.

Although a metaphor, cloud computing provides tangible advantages for the end user by minimizing their need for additional hardware, software, technical expertise and support. Internet service providers (ISP) supply the end user with a path to access World Wide Web resource nodes on the Internet anywhere there is wired, wireless or optical connectivity. Hardware is software driven and the key to connectivity is software such as, a web browser interface which is installed on the end user's computer or mobile device. The web browser enables the end user to navigate, retrieve and display web pages, images, video and other content. To play back music files requires a media player. Most media players are compatible with some operating systems and not others, so they lack interoperability and flexibility. Some media player applets may only playback audio files but not video files or vice versa, while a few will playback both audio and video MMFs. As the name implies, a media player only plays back, so the end user must use other types of file sharing software to search and download a particular MMFs to their desktop. Then, an end user has to use a USB connection to download those MMFs from their desktop to their MP3 device. None of these stand alone media players embody all of the functions, flexibility, integration and interoperability of the presently claimed invention's capabilities which includes online media player(s) and/or recorder(s). The presently claimed invention's online media player(s) and/or recorder(s) are accessible, compatible and interoperable any time the end user connects to MJZ. Therefore, the end user does not have to use several different stand alone applets. Nor does the MJZ user have to develop the technical expertise or algorithms to make the output of each of the stand alone applets compatible. Other software applets do not provide the functions of harmonizing, blending or synchronizing for parallel playback of personalized MMFs which do not change device settings.

Figure 2:
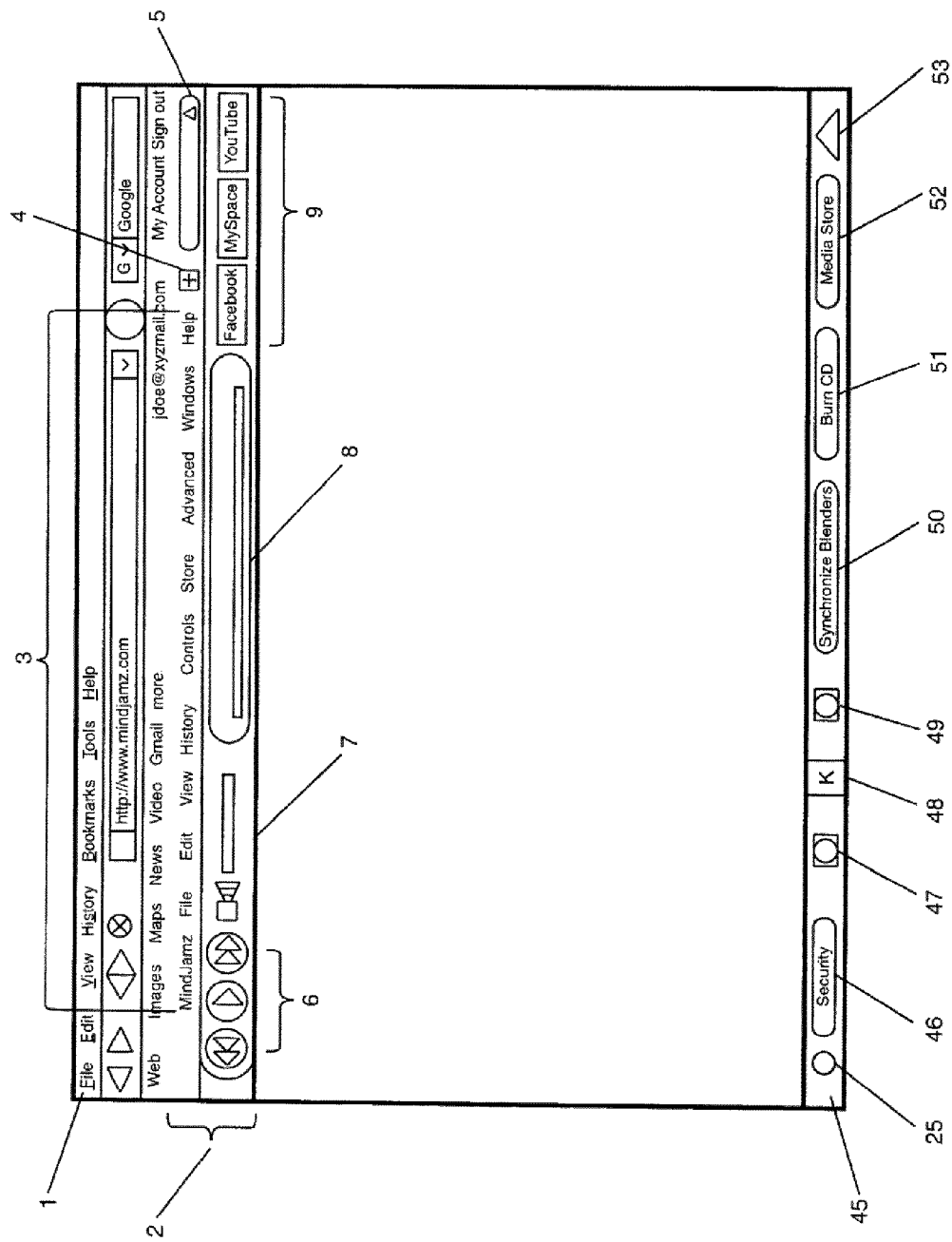
FIG. 2 is a screenshot of the three tool bars including the browser toolbar, MJZ toolbar and, MJZ shortcut toolbar.

In the preferred embodiment as illustrated in FIGS. 1 and 2, there are a total of eighteen function modules. In FIG. 1, there are twelve flexible function modules and they include: browser tool bar 1; MJZ tool bar 2; media library 10; video and text player display 14; media browser 16; (media) search results 19; media blender 21; devices 26; beta brain wave player 28; affirmation recorder 35, affirmations library 41; affirmation blender 42 and, MJZ shortcut tool bar 45. FIG. 2, further illustrates the MJZ shortcut tool bar 45, on which five other shortcut function modules are located and depicted by shortcut icons for: security 46; video and text player display 47; Karaoke display 48; text to speech 49; and synchronize blenders 50.

Also illustrated in FIG. 1, are a number of icons which are used as follows: Δ=inactive; ∇=active; □=light emitting diode (LED) light off; ▣ or ⊙ =for LED light on; ♫=music; ⊕ =Internet and; -, |=scroll bar. When a corresponding media library is clicked-on then, the respective inactive icon Δ is rotated down ∇ to signify the active position, and reveal a subset of a drop down menu or playlist. If the LED off light, □, is turned on it is shown as ▣ or ⊙ , and this indicates that some function is being used or in-operation. The music symbol, ♫ , indicates a music search has been completed or music is playing. The globe ⊕ indicates the capability to do an Internet search which when completed shows the search results by artist, title and file format. Scroll bars, -, | are manual controls to navigate extended content of a media library and or media playlist.

As noted above, the presently claimed invention utilizes four terms such as, click-on, shortcut icons, symbols and links. Often the term icon and symbol are used interchangeably; however, the presently claimed invention does not do so, as it prefaces a specific icon with the term, "shortcut", so the shortcut icon stands for a specific function such as, shortcut to security 46, shortcut to video and text player display 47, etc. Each of these four terms has a different technical meaning as to the rules that govern the programming of the characters or strings of character to execute or not execute the respective underlying command.

As noted above, alternative embodiments are possible. For example, video and text player display 14, can also be used as a display for album cover flow 15, as a display for selected movie or video files, and as a display for Karaoke text files. It is also important to note that a display 14 is different than windows 22, 43 or 36. Another example is that each flexible function module 1, 2, 10, 14 and 16, 19, 21, 26, 28, 35, 41 and 42 and tool bar 45 with shortcut module Icons 46, 47, 48, 49 and 50 can be used independently or in combination with some or all of the other flexible function modules. And, within flexible function modules 2, 10, 16 and 19, 21, 26, 28, 35, 41 and 42 there are subsets of executable function tasks elements which are italicized, for each of the forty-three function task elements 3, 4, 5, 6, 7, 8, 9, 11, 12, 13, 15, 17, 18, 20, 22, 23, 24, 25, 27, 29, 30, 31, 32, 33, 34, 36, 37, 38, 39, 40, 43, 44, 51, 52, 53, 54, 55, 56, 57, 58, 59, 60 and 61, that the end user can use to enter, search and store information or to activate, inactivate and change settings or, select devices. Although this example lists forty-three (43) elements, any other number of elements is envisioned and can be used. Operation of flexible function modules and their function task elements along with their end products/services will be made clear when their respective figures are discussed in detail. It should be noted that FIG. 4 through 11, each illustrate a partial static view rather than a dynamic online example of what occurs within the entire virtual application when the end user executes an input. In some examples, references to more than one figure are required to discuss the executable online dynamics of user inputs.

The MJZ subliminal end product starts as three separate MMFs. Two of the three MMFs are first harmonized and then blended together into one subliminal MMF. The blended subliminal MMF is then synchronized to play in parallel with the third MMF. The blended and synchronized MMFs can be audio MMF, video MMF and/or an audio-video MMF, and, when named, it will be stored/saved in a playlist with the name ending with an asterisk (*). The name will also appear in the video and text display surrounded by a border .

Figure 3:
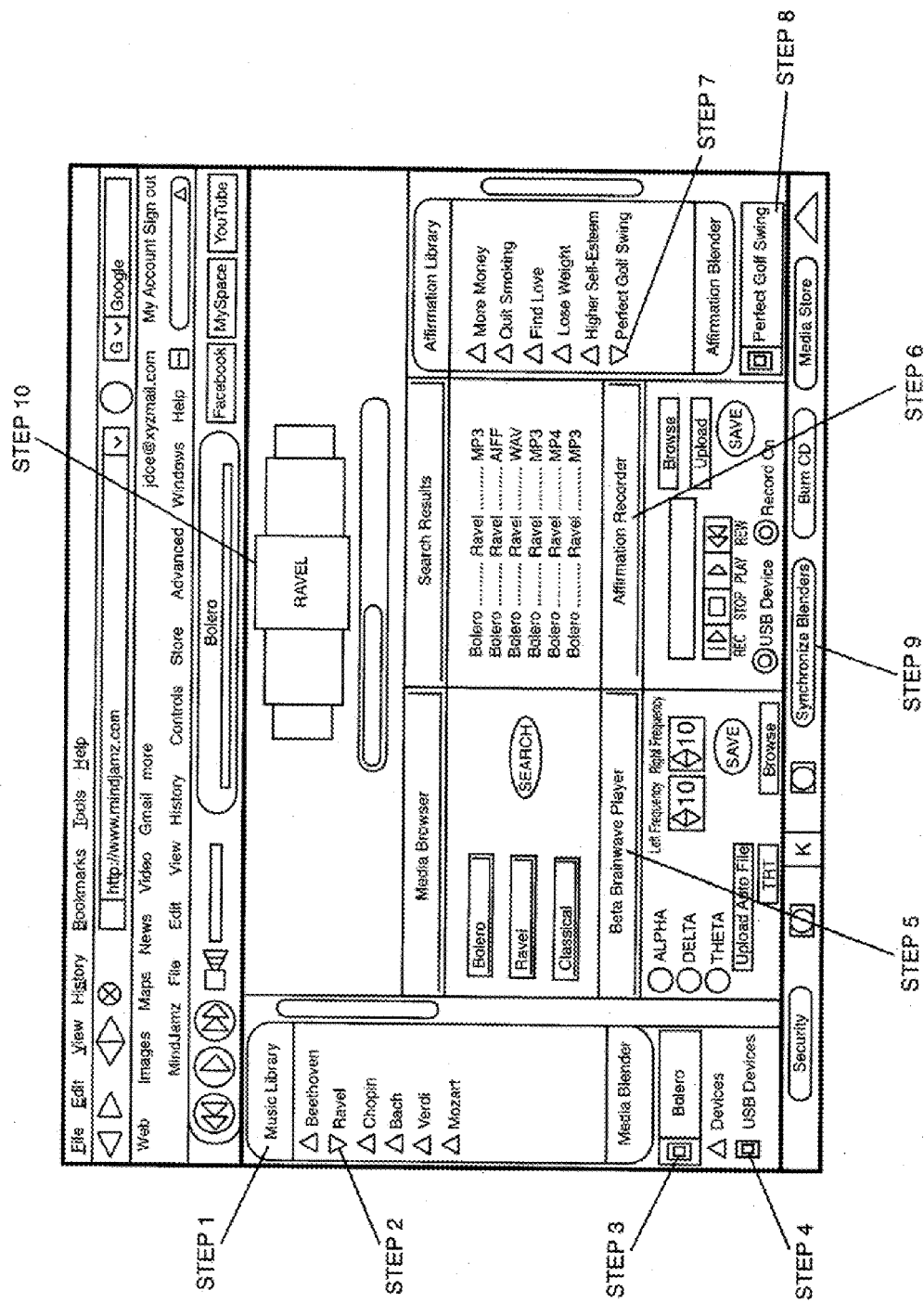
FIG. 3 is a screenshot showing the sequence of steps 1 through 10 as a guide to use of function modules.
Figure 10:
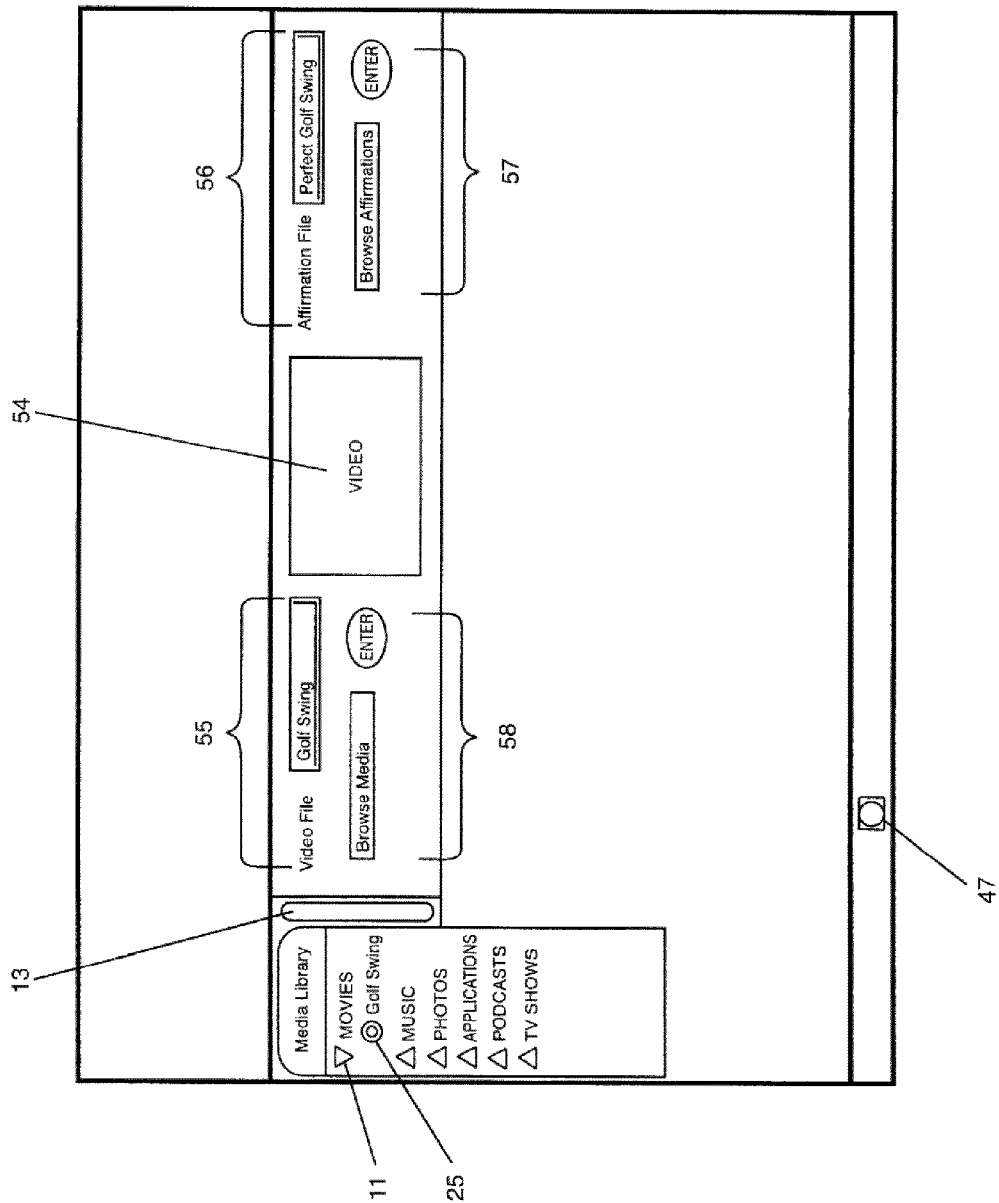
FIG. 10 is a screenshot showing the video player display open to a video of Perfect Golf Swing.
Figure 11:
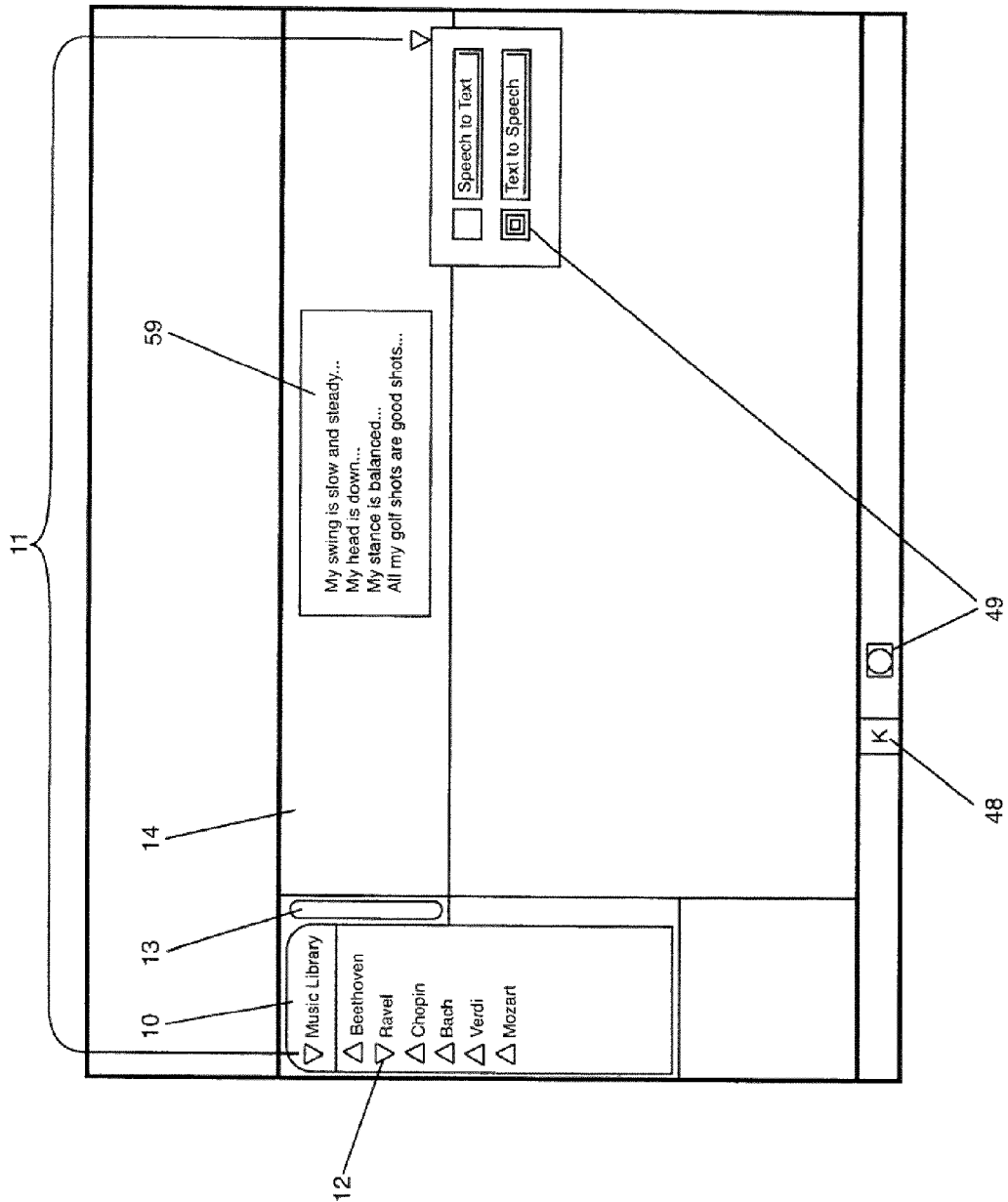
FIG. 11 is a screenshot with the Karaoke video player display open to affirmation text for Perfect Golf Swing.
Figure 12:
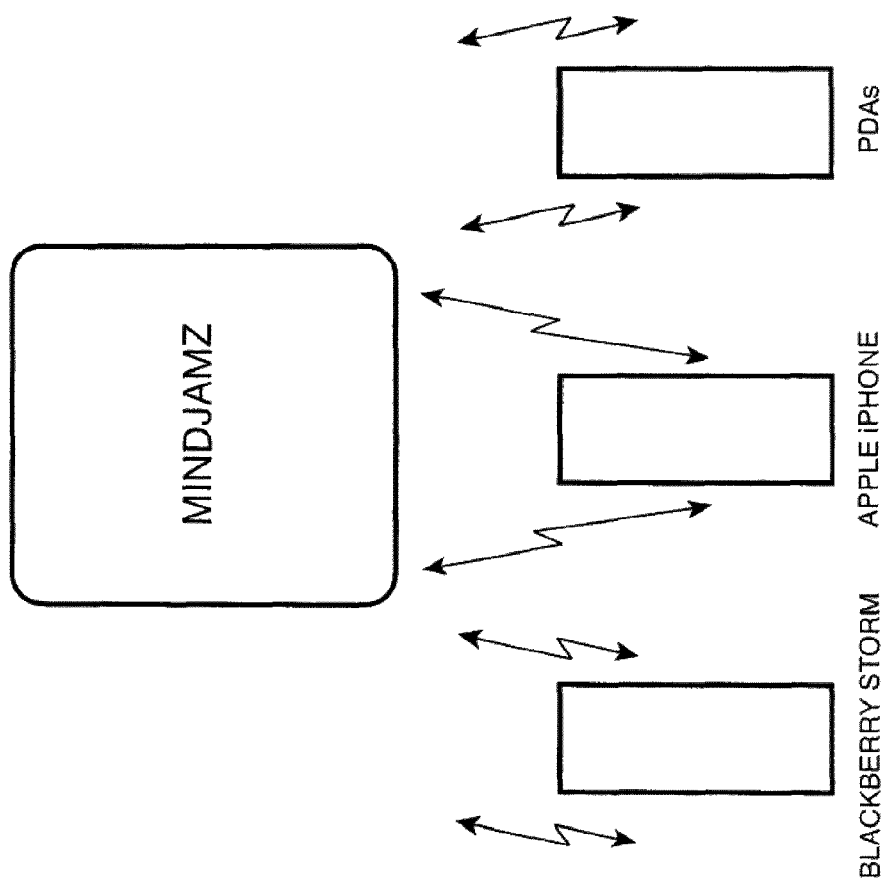
FIG. 12 shows the wizard communicating with some popular web enabled mobile devices.
Figure 13:
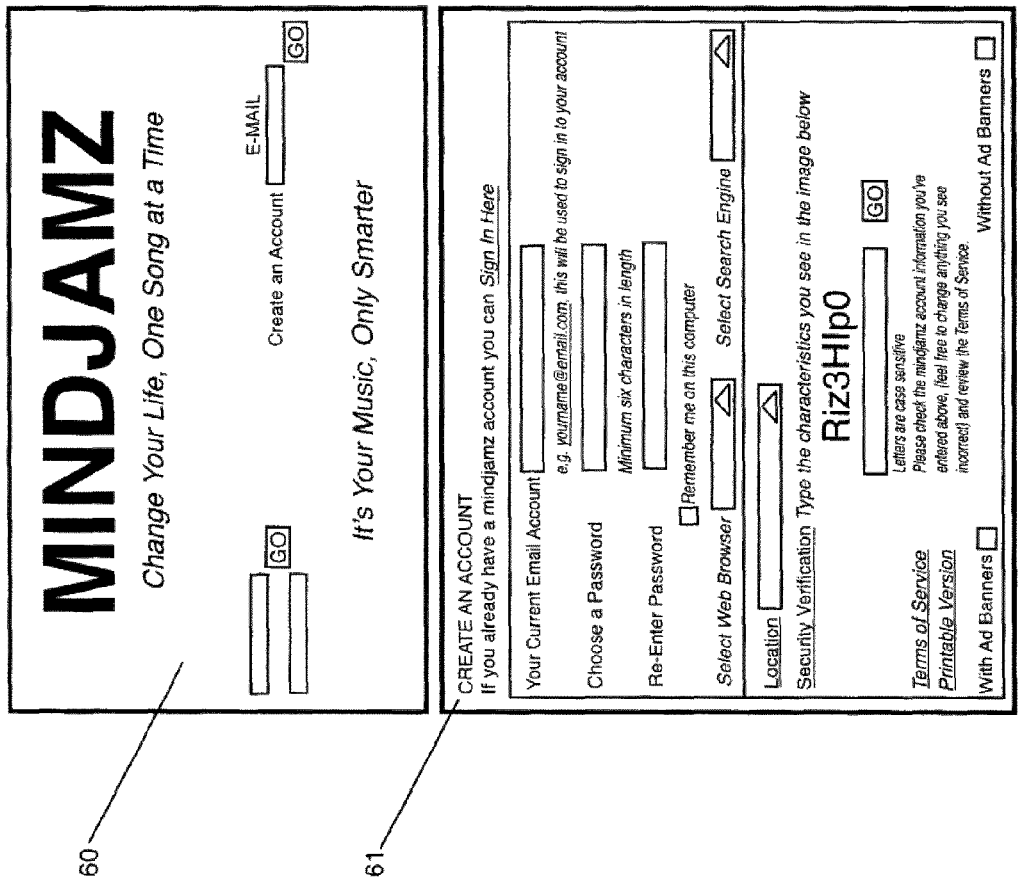
FIG. 13 is a screenshot showing MJZ opening a MJZ account or logging-on and setting security and privacy.

FIG. 1 through 13 are static illustration rather than dynamic examples of what can occur within the entire application when an online input is executed. FIGS. 1, 2 and FIG. 4 through 11 illustrate the technical means of the flexible function modules and shortcut modules which the end user controls to search, organize and manage the subliminal MMF they choose to create. FIG. 3 illustrates the basics of sequential ten step method to search, create, harmonize and blend a covert suggestion into an end user secure subliminal affirmation MMF. This blended subliminal affirmation is then synchronized with end user's selected overt music MMF. The Mindjamz* end products/service can be securely saved and recalled for playback by the end user. In order to create an audio, visual or audio-visual Mindjamz* end product/service, the basic ten step method is shown in FIG. 3 in serial order as steps 1 through step 10. Depending upon the task selected by the end user, the ten step method does not need to sequentially follow the serial order, as the end user can begin or end with any of the function modules or; by using the shortcut icons to create audio, visual or audio-visual MMFs. In the alternative, as illustrated in FIG. 10, the same basic ten step method or, shortcut Icon 47 can be used to create a video or audio-video Mindjamz* for a Golf Swing* or displayed as Golf Swing . FIG. 11 illustrates the shortcut to Karaoke display 48 to create and display a Karaoke text display 59 and; FIG. 12 illustrates the use of the shortcut wizard 49 to enable wireless 2-way real time connection to MJZ wizard by three of the more popular web browser devices within the broad mobile device category. FIG. 13 illustrates logging-on with a password and creating a user account. The technical means and method of the MJZ modules or shortcuts can be executed serially or individually or in combination, as determined by the end user.

Typically, the end user begins with the selection of music. MJZ considers music to be an overt precursor to the critical "inner-active" moment for active participation. As such, music is a pseudo suggestion that "inner-actively" cues both the mind and brain into a heightened state of awareness to expect covert sensory stimuli, in the form of a beneficial subliminal message that the end user created and controls. To create the beneficial subliminal message, the end user harmonizes a beta brain wave frequency with an affirmation suggestion and blends them together into a single subliminal MMF whose total-running-time (TRT) is synchronized to play in parallel with a selected music MMF. Embedded within the MJZ system platform is a language parsing algorithm and method for syntactic and lexical analysis, as an internal security constraint against the construction of aberrant affirmations by end users.

Figure 4:
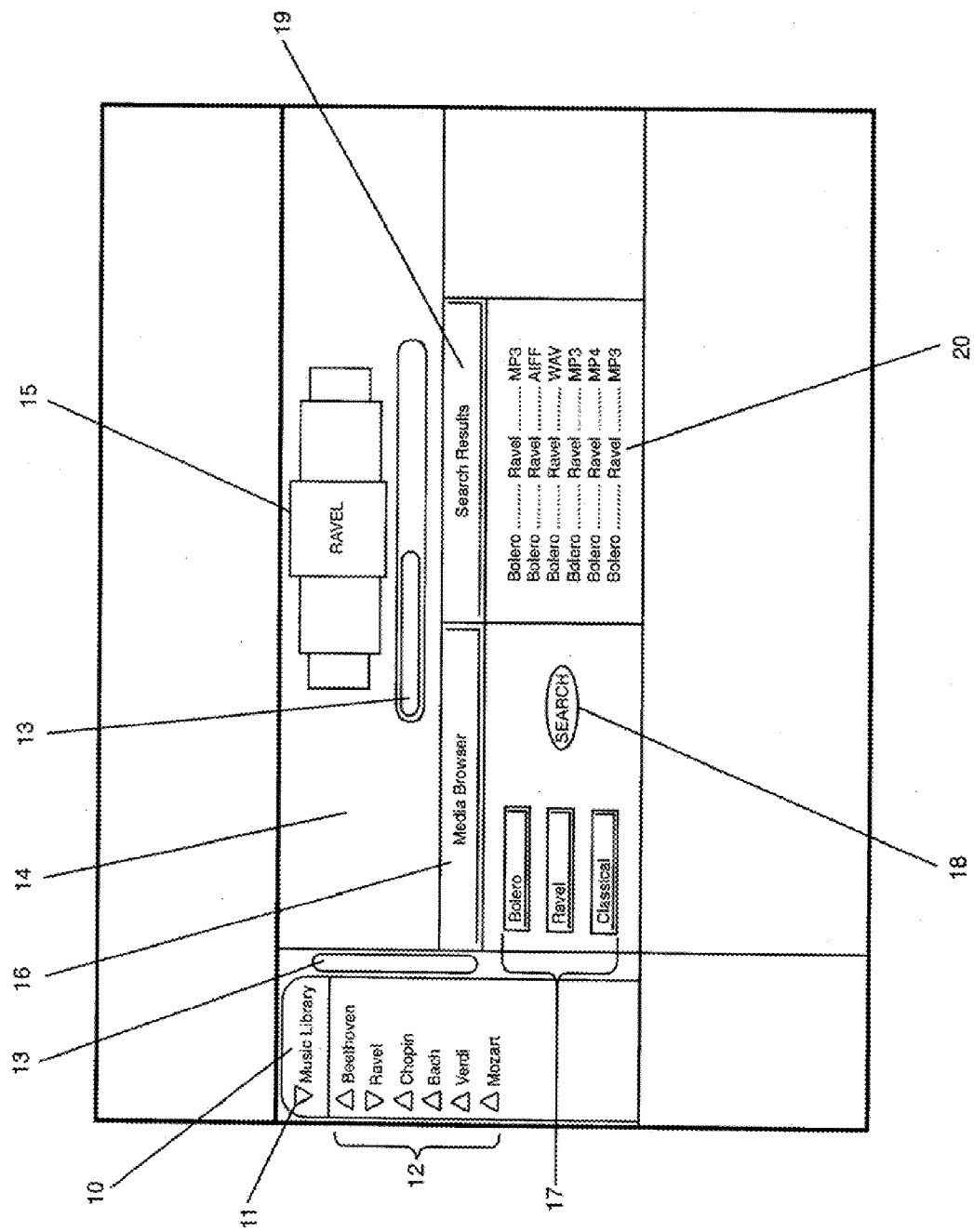
FIG. 4 is a screenshot of the media library open to the music library and a playlist for the music of Ravel.

FIG. 1, as noted above, illustrates and numerically identifies the twelve flexible functional modules and the three tool bars, one of which is shortcut tool bar 45 which includes five shortcut modules. It should be noted that in FIG. 1 all of the flexible function modules are inactive, as indicated by up position Δ of active/inactive icon 11 in the media library 10 and devices 26. Within media library 10 there are user definable media library categories such as, movies, music, radio, etc. These media libraries can be activated by mouse clicking directly on music, movies, radio etc. FIG. 4 illustrates media library 10 has been opened to music library 10 and it is active on playlist 12 for the composer Ravel per the respective down position ∇, of active/inactive icons 11.

FIG. 2, illustrates the three tool bars—browser toolbar 1; MJZ toolbar 2 and MJZ shortcut toolbar 3 and their respective tools and shortcuts. The commands on browser toolbar 1 are standard commands found on most web browsers. The commands options and shortcuts on MJZ toolbar 2 include: MJZ toolbar options 3; shortcut to create playlist 4; search bar 5; manual track controls 6; manual volume control 7; track running time (TRT) display 8 and social network links 9. MJZ shortcut toolbar 45 has shortcuts, commands and options: LED on/off icon 25; shortcut to security 46; shortcut to video and text display 47; shortcut to Karaoke display 48; shortcut to wizard 49; shortcut to blend playlist 50; shortcut to burn CD 51; shortcut to media store 52 and, shortcut to eject CD 53.

FIG. 3 illustrates the sequence of steps 1 through step 10 that the user can follow to create their own secure audio, video or audio-video Mindjamz* MMFs. It should be noted that the end user can, depending on the task-on-hand, follow almost any sequence of the tens steps to create a secure Mindjamz* and/or parts thereof. The following example will detail the steps to harmonize and blend an audio subliminal affirmation file which will then be synchronized with a selected music file without. As illustrated in FIGS. 1 and 3, step 1 shows the media library 10 with the different user definable library categories such as movies, music, radio etc. In FIG. 3, step 2 illustrates media library 10 was opened by mouse clicking-on music library, and the Active/inactive icon 11 is now rotated to the down position ∇. The same ten steps can be repeated to make a video or audio video file except that in step 2, media library 10 will be opened to the movie library, as illustrated in FIG. 10.

FIG. 4 further illustrates what occurs in step 2 when music library 10 is active to reveal a hidden drop down menu of user definable music playlists 12 and the respective artist composers. In this example, music playlist 12, is active for the artist Ravel. Turning to media browser 16, it shows that user defined search bar criteria 17 for the artist is Ravel, the title is Bolero and, the genre is classical. Then the end user mouse clicks-on media browser search button 18 to initiate the Internet search. The search results are shown in search results 19 as search results with file formats 20 for Ravel's Bolero. This line-by-line list of search results includes their file formats such as, WAV, AVI, MP3, MP4 etc and they may be imported directly into MJZ. The importance of knowing the file formats will be discussed in FIG. 5. Also in FIG. 4, video and text player display 14 shows the corresponding Ravel CD album covers in cover flows 15 and scroll bar 13 can be used to scroll through the line-by-line list of CD album cover flows 15. In addition, the end user may also import music or video files from other sources such as, file sharing, purchasing music from on-line music stores and/or creating their own music or videos to use in MJZ.

Figure 5:
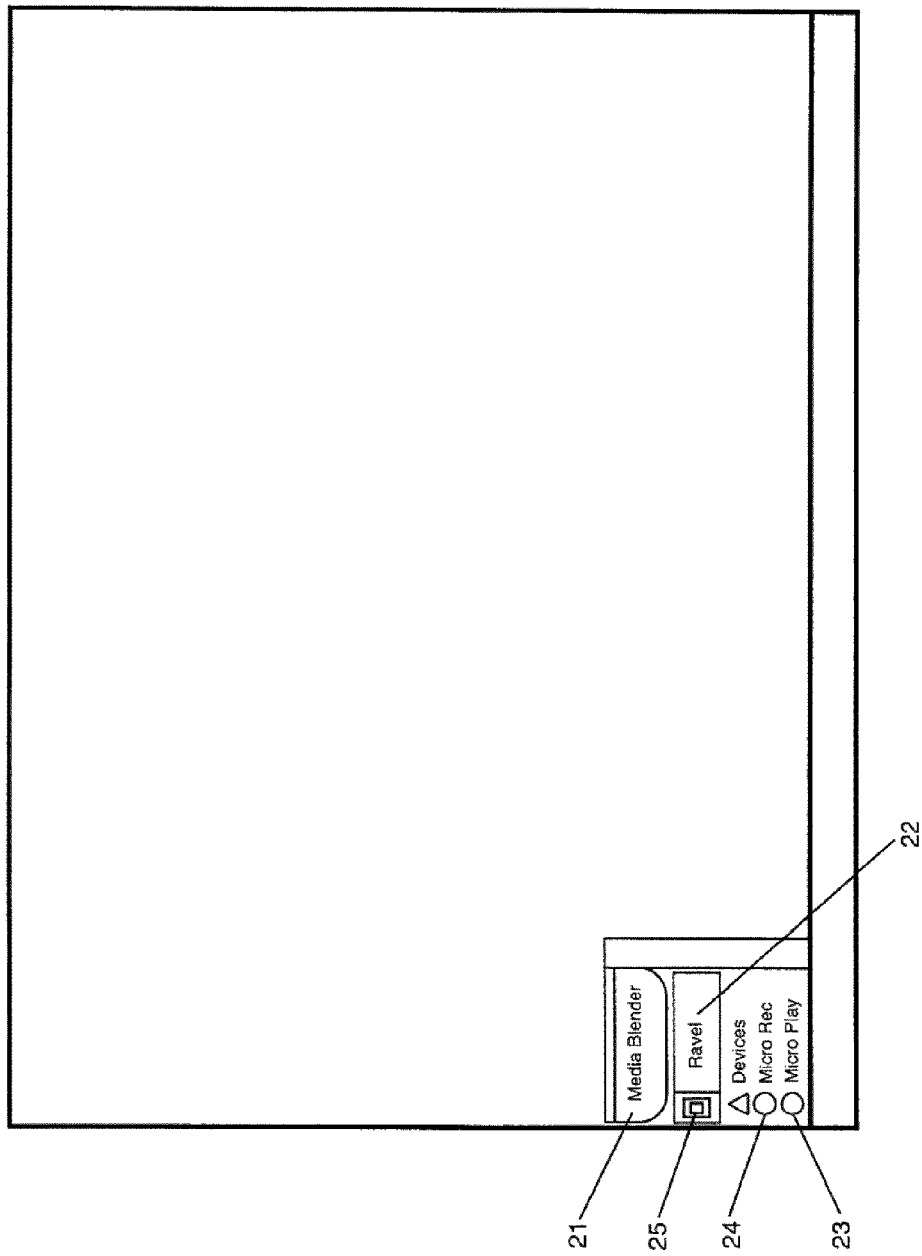
FIG. 5 is a screenshot of the media blender.

FIG. 5 illustrates what occurs in step 3 when the music, in this case Ravel's Bolero, is selected to be dragged and dropped into media blender 21. The named artist file, Ravel, will appear in selected media file window 22. Alternatively, there are two other entries in music playlist 12 identified as compilation and downloads. These are used to drop-in and hold multiple media files or; to import multiple media files in order to drag and drop multiple media files into media blender 21. When multiple media files are in media blender 21, they can subsequently, in FIG. 9—step 8, be matched with the blended subliminal affirmations in affirmation blender options 44. Also in FIG. 5, media blender 21 includes both a micro player 23 and micro recorder 24. As mentioned above, file formats denote important technical standards but not all file formats are compatible with other file formats. Also, new file formats will inevitably be introduced and recognized as standards. As required, these file formats must be converted and/or made compatible. This can be accomplished by automatic technical features such as, using a file table, a compatibility algorithm, data compression encoding and/or the micro player and the micro recorder, as necessary.

Figure 6:
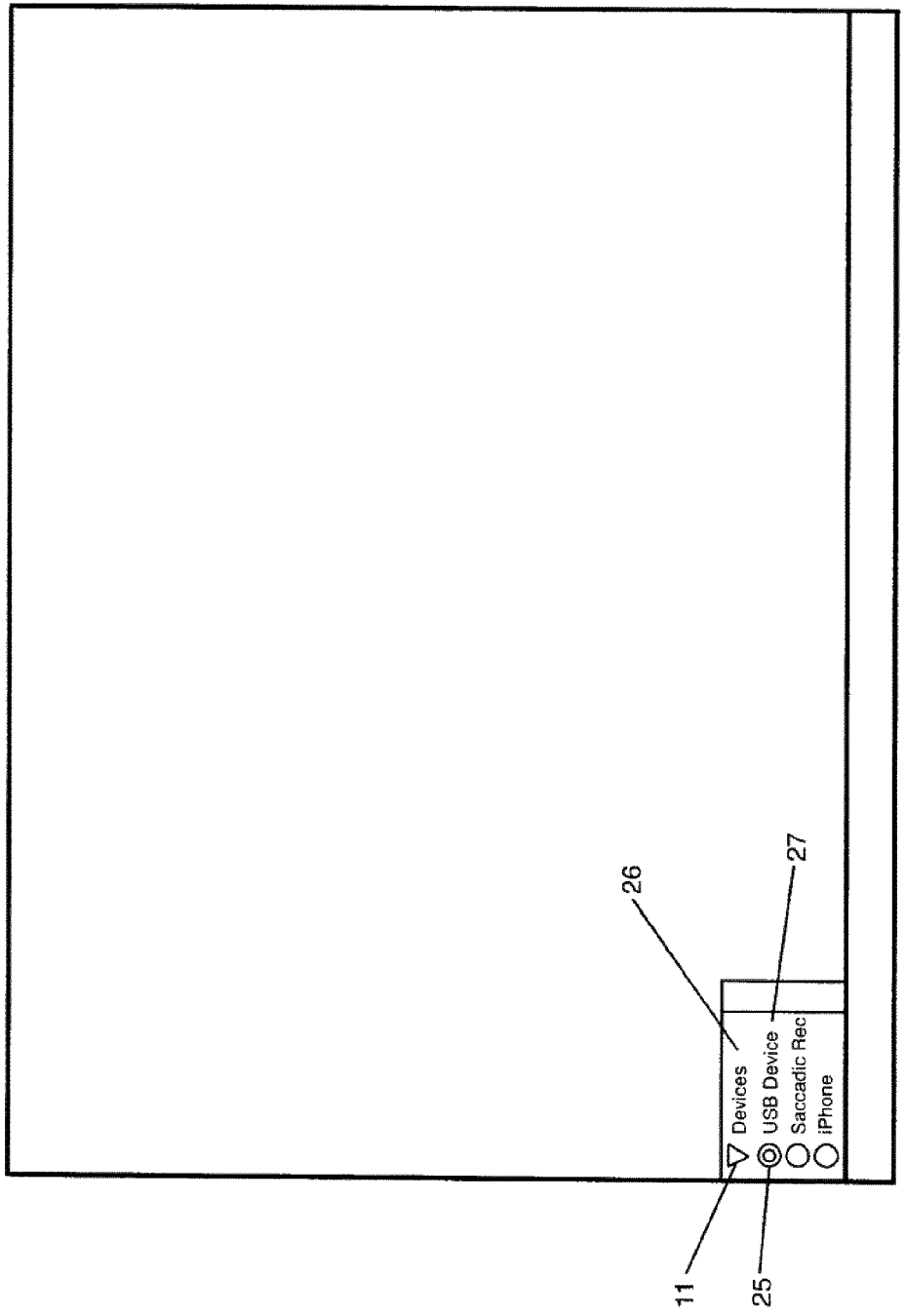
FIG. 6 is a screenshot of the devices dropdown menu.

FIG. 6 illustrates what occurs in step 4 in order to begin creating a subliminal file. By mouse clicking on devices 26, a drop down menu appears enabling the end user to select a USB device 27 such as, but not limited to a microphone, camera, video recorder, personal display device, cell phone, plug-and-play devices, saccadic devices, memory stick or card reader devices. In FIG. 6, when the device is activated inactive/active icon 11 is rotated to the down position ∇ to signify the drop-down menu is active and LED icon 25 light is turned on 🔲 to indicate USB microphone 27 is selected and plugged into affirmation recorder 35, in FIG. 7. In turn, two LED icons 25 and 25 lights are turned on ◎ at the bottom panel of affirmation recorder 35 indicating the end user can use USB microphone 27 to record a secure and safe affirmation which occurs in step 5 and step 6.

Figure 7:
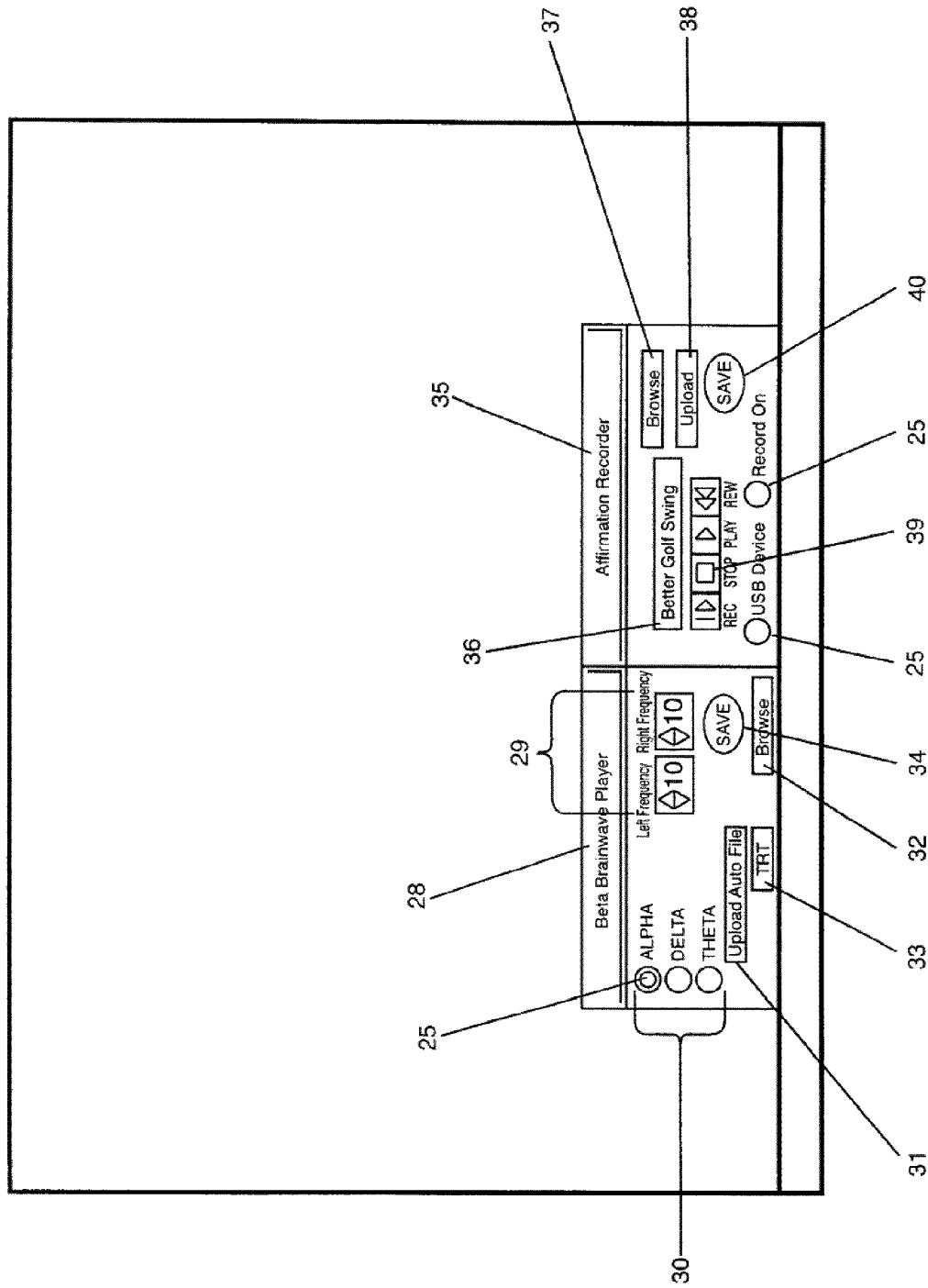
FIG. 7 is a screenshot showing the beta brain wave player and affirmation recorder.

FIG. 7 illustrates what occurs in step 5 and step 6 with regard to beta brain wave player 28 and affirmation recorder 35. First, with beta brain wave player 28, the end user can select one of three pre-programmed defaults 30, alpha, delta, theta beta brain wave frequencies. The pre-programmed defaults can also be changed manually or imported from other sources by the end user. In the FIG. 7 example, the track for alpha 30 is selected. This can be confirmed, by LED icon 25 which is turned on ◎ and it also indicates that micro player 23 and micro recorder 24 are also activated. Right and left track frequency control 29 window shows 10 and 10 as the current settings and each falls within the alpha range. Alternatively, if a delta or theta track setting is selected the corresponding defaults settings will appear in the window, or, the track frequencies can be set manually. Once the beta brain wave track frequencies are set, then the end user can use browse 32 button to browse for a previously saved audio file. When browsing for an audio file the name of the audio file being browsed will appear in the window for upload audio file 31 and that audio file can be uploaded into affirmation recorder 35 by clicking directly on upload audio fife 31 button. If the end user did not previously save an audio file then, they can use a number of USB devices, which in this example is a USB microphone 27, to record an audio affirmation using affirmation recorder 35.

FIG. 7 further illustrates an example to harmonize and blend an audio subliminal affirmation. Previously in step 4, USB microphone 27 was connected to affirmation recorder 35 and LED icon 25 for record is turned on ◎. Now in step 5 and step 6, the end user has the option of recording an affirmation which in this example is "Quit Smoking", as shown in affirmation title window 36 on the affirmation recorder. Or, the end user can click-on browse 37 button on affirmation recorder 35 to browse affirmation library 41, illustrated in FIG. 8 to find a previously recorded quit smoking affirmation. Referring to FIG. 7, and clicking-on upload 38 button, the previously recorded subliminal affirmation "Quit Smoking" will be uploaded to affirmation recorder 35 and its title "Quit Smoking" will be displayed as the active file in affirmation title window 36. Whether the affirmation was previously recorded and saved in the affirmation library or the affirmation was just recorded, the next steps are the same. The "alpha" file is now active in beta brain wave player 28 and the "Quit Smoking" affirmation file is now active in affirmation recorder 35. Next, harmonization of both these files can now be done when the end user clicks-on TRT 33 button to harmonize the beta brain wave configuration with the total-run-time of each of these two files. The next step is to blend these two TRT harmonized files into one subliminal audio file. Blending occurs when the end user clicks-on save 34 button on beta brain wave player 28 and save 40 button on affirmations recorder 35. By simultaneously clicking on both save 34 and save 40 buttons, two things will occur. First, the TRT harmonized beta brain wave "alpha" and "Quit Smoking" files will be blended into a single alpha brain wave-quit smoking subliminal affirmation file with TRT track settings. This blended single subliminal affirmation track with TRT settings will be saved in affirmation library 41, as a "Quit Smoking" track, as shown in FIG. 8.

Figure 8:
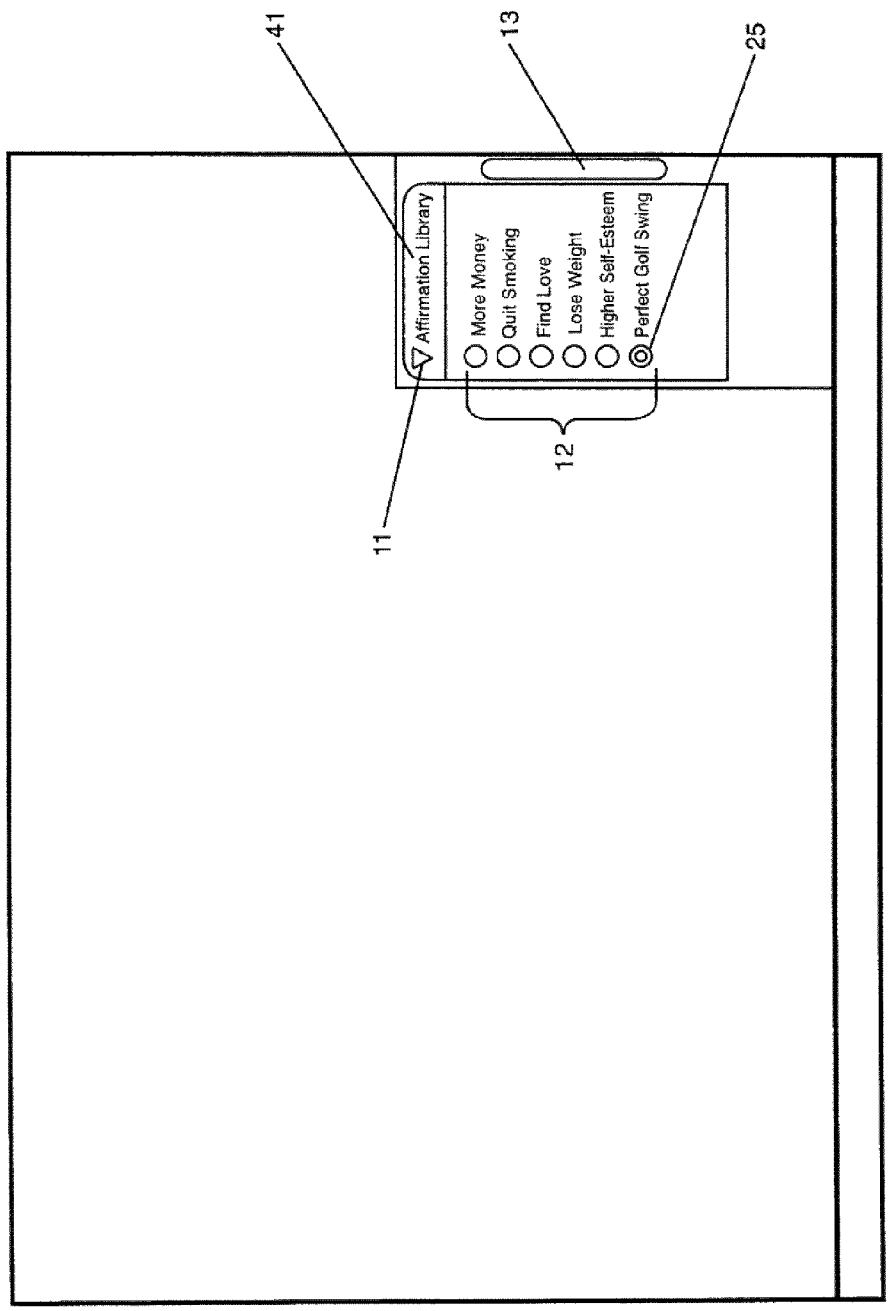
FIG. 8 is a screenshot of the affirmations library open to a quit smoking track.

FIG. 8 illustrates step 7 with affirmation library 41 being active, as indicated by active/inactive icon 11 being rotated to the down position ∇. Returning to step 5 and step 6, the now blended single subliminal alpha-quit smoking affirmation with TRT track settings is saved to affirmation library 41 in user defined affirmation track 12, as "Quit Smoking". This is confirmed by LED icon 25 light being shown as turned 🔲. A slide control is illustrated as scroll bar 13 and it can be used to scroll through each saved track in the affirmation library or through different saved affirmation tracks 12. Saved subliminal affirmation track(s) 12 may contain more than one subliminal affirmation nested within each respective affirmation track 12. A nested affirmation track 12 can be opened by clicking-on it to reveal each individual subliminal affirmation track within that nesting.

Figure 9:
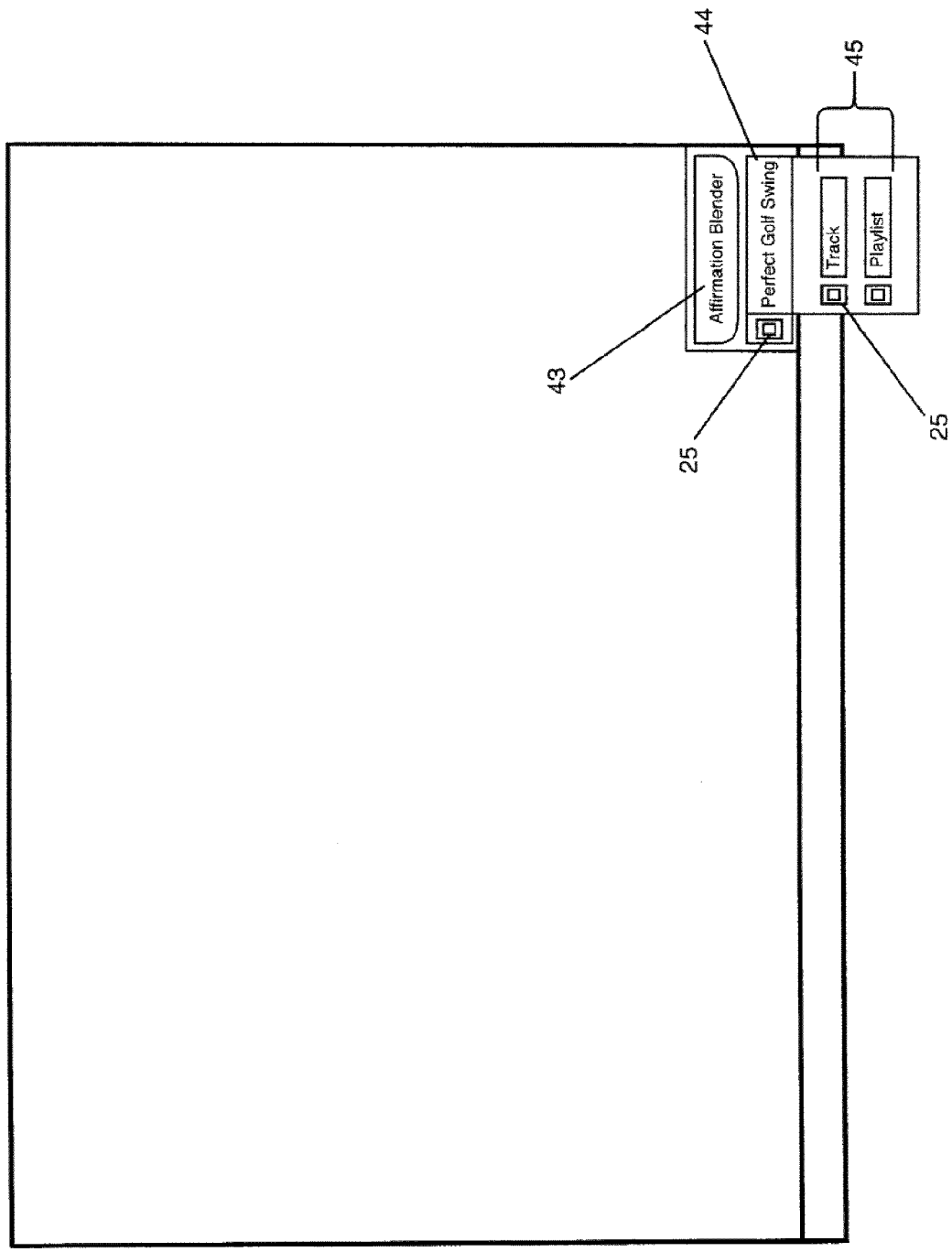
FIG. 9 is a screenshot showing the affirmation blender with the quit smoking track selected.

FIG. 9 illustrates that in step 8 the "Quit Smoking" track has been dragged and dropped into affirmation blender 42. This is confirmed by the "Quit Smoking" track which now appears in affirmation blender selected track window 43 and it is active per LED icon 25 shown as turned on 🔲. By clicking-on affirmation blender 42, a drop down menu will appear to reveal affirmation blender options 44 which can be used to match-up the affirmation track(s) in affirmation blender 42 with the media file(s) which had been dragged and dropped into media blender 21, in FIG. 5, step 3.

Referring back to FIG. 3, it illustrates what occurs in step 9 and step 10 to avoid problems by changing or altering a media file. At the bottom of FIGS. 2 and 3 there is MJZ shortcut toolbar 45 with shortcut to synchronize blenders 50. In step 9, by clicking on shortcut to synchronize blenders 50, it takes the Ravel media audio file in media blender 21 and it automatically synchronizes it with the blended subliminal affirmation track for Quit Smoking and TRT setting in affirmation blender 42. During step 10, three synchronizations occur: i) the file formats in each of blenders 21 and 42 are again compared for compatibility; ii) the total run times (TRT) for each of the files in blenders 21 and 42 are matched as to each of their run-time durations during parallel playback and; and iii) these files, although separate, are logically paired together and automatically saved with an asterisk, that signifies the physical integrity of each file so each can be recalled and played back in parallel without modification.

Again referring back to FIG. 3 and step 10, what is not illustrated is the music playlist into which the synchronized Mindjamz* audio file of Ravel-Quit Smoking with TRT was saved. Rather, what is illustrated in FIG. 3 is the synchronized Mindjamz* subliminally synchronized audio file which is graphically depicted in video player and text display 14, as the cover flow 15 for Ravel with a black border indicating it has been saved as a Mindjamz*

The example of creating one Mindjamz* subliminal audio file saved as Ravel was shown above in step 1 to step 10 and illustrated in FIGS. 1 through 9. Alternatively, by referring to FIG. 4, the end user can use compilation or downloads 12 playlists to aggregate a number of audio files and input them into media blender 21 and synchronize them with just one subliminal affirmation track placed in affirmation blender 42, or, using compilation or downloads 12 playlists, the end user can input a number of audio files into media blender 21 and match each audio file with different blended subliminal affirmation tracks in affirmation blender 42, by referring to the FIG. 9 and using tracks and playlist 44 before clicking-on synchronize blenders 50.

As shown above, step 1 through step 10 along with FIGS. 1 through 10 can also be used to create an audio-video Mindjamz* of Golf Swing as follows. Referring to FIGS. 1 and 3, step 1 opens media library 10 by clicking on movies. Then referring to FIG. 10, it illustrates step 2 with movies library 11 open, as indicated by inactive/active icon 11 being rotated to the active down position ∇. Steps 3 through step 10 are repeated. In FIG. 10, the golf video is illustrated as being active per LED icon light 25 being turned on 🔲 and the golf video being shown in video player and text display 14. The name of this video track, "Golf Swing", is shown in video file 55 window as being active. Next, the subliminal video affirmation track title, "Perfect Golf Swing", is shown as active in affirmation file 56 window and it is dragged and dropped into affirmation blender 42 (not shown). Once these are placed in their respective blenders 21 and 42, the end user then clicks-on synchronize blenders 50 to create and save the audio-video Mindjamz* Golf Swing. Alternatively, if the desired golf swing video is not in movies library 11, then the end user uses browse media 58 to search for golf swing videos to be dragged and dropped in media blender 21 and synchronized with the subliminal affirmation in affirmation blender 50. With the "Golf Swing" media file in media blender 21 and the "Perfect Golf Swing" subliminal affirmation with TRT track in affirmation blender 42, the end user then clicks-on synchronize blenders 50 to create and save the audio-video Mindjamz* Golf Swing which then appears in cover flow 15 window.

FIG. 11 illustrates what occurs after the shortcut to MJZ Karaoke 48 is activated. This Karaoke shortcut enables the end user to review, edit or script a text version of audio files, such as a previously recorded subliminal audio affirmation track which was saved in an affirmation library playlist. Karaoke 48 can also be used to compose or edit affirmations as scripted text before they are recorded as an audio affirmation. Karaoke 48 can also be used to review words in audio or video files which are imported from shared web sites or from paid online sites or online learning sites. Typically, Karaoke displays an audio input as script or text. MJZ also includes a corollary feature. This is illustrated in FIG. 11 as a shortcut for Karaoke text to speech 49 in which a script or text file is synthesized into an audio file.

FIG. 12 illustrates some of the more popular mobile devices with web browsers that connect to MJZ via the MJZ applet, the MJZ wizard. Mobile devices are a very broad category of web browser devices which are differentiated as to features and functions by their manufacturers. Some can be used as a computer or a personal data assistant (PDA) each with its own integrated media player, so each of centric mobile devices with the MJZ wizard can connect directly to MJZ. Irrespective of competing standards by manufacturers, if a mobile device is web enabled, it can use the MJZ wizard to access the MJZ platform. However, depending upon the features and functions of the web enabled mobile device it may be more practical for the end user to manage their music MMF via their computer and use a USB interface to sync their computer to their mobile device to playback Mindjamz*.

FIG. 12 also illustrates a wireless communications system by the use of two-way arrows between-and-among MJZ and some, but not limited to, popular mobile devices depicted. The wireless system refers to electronic circuits which include full-duplex (FDX), half-duplex (HDX) or one-way direction (either "in" or "out") and devices such as transceiver, transmitter or receiver. The convergence of wireless, microprocessor, stimulus and sensor technologies in medical research is giving rise to a data driven revolution that can change the quality and length of people's lives. This has led to the development of powerful monitoring tools to track and gather raw personal data including, but not limited to, heart rate, blood pressure, blood sugar levels, weight, body fat, muscle strength, steps walked, speed and distance. stress levels, mood, pain and saccadic eye movement. The quantitative quest for biometric measurements is morphing into a popular movement called "Living by the Numbers". An integral part of using the raw data are online "Health Hubs" which provide end users with numerical analysis to find patterns or establish plans that can be used to optimize goal setting and performance. As more powerful tools become available, it is becoming possible to match the data to goals, learning and personal development. Further, with secure subliminal stimulation being delivered contiguous with one's preferred music, it is possible to optimize learning and development. And research has shown that development and performance can be reinforced via bio-feedback loops or closed circuit feedback loops. The key issue is to provide reliable unbiased means to capture the biometric data via means such as, device 26 illustrated in FIG. 6 and/or via the communications system as illustrated in FIG. 12, and described above. The data capture capabilities are important for medical research and the end user. These give medical researchers a clinical means to collect and study data from large populations which are segmented by specific life interests. And, both medical researchers and end users can use the analytical tools they have available to evaluate the impact of subliminally stimulating learning, modifying behavior, reinforcing development and performance which, in some instances, can occur in real time, if FDX communications means are operative.

FIG. 13 illustrates MJZ log-on page 60 and create account page 61. When an end user connects to MJZ these pages appear. If the end user creates an account, subsequently logs-on, or changes any parameters on log-on page 60 or create account page 61, the security and privacy levels set are augmented and supported by anti-viral protection at the system level. Each end user account is user name matched and password protected. Security against hacking, web crawlers or spiders is enabled when the end user confirms their assigned specific alpha-numeric code Riz3H1pO, as depicted in FIG. 13. Privacy is established by checking either "with ads" or "without ads".

Cloudware, cloud computing, communications, and browser enabled devices are transforming technologies which blur the distinction as to how computing is and will be done, what devices can be used, as software product or service, and the end user's power of choice. This transformation is also impacting the Internet's global infrastructure of network of networks. In turn, end user access and connectivity to commerce, content and community is also undergoing change. The Web is emerging as the online hub of these transformations and changes. The Internet provides access and the web provides connectivity. The Web, as the hub, brings together devices and the end user via the browser. The Web, as the hub, is also redefining productivity as online productive growth opportunities for the end user, business enterprise and developers of software, developers of multiple device products and developers of services. One of the best examples of the trends in transformation and change is occurring in communications. In particular, in social communications where end user choice is the driving force to online connectivity, content and community web sites. In FIG. 2, there is a Social Networks Link 9, that the end user can, using a popup menu, create links to the favorite social networks or other networks. Another example of the trend in transformation and change in enterprise is taking place in the arenas of business and government. Although not apparent, business enterprise can choose what information they want to put online versus what they choose to keep off line. Conversely, government enterprises are choosing to lead the way in the making online information the norm. Transforming technology and resulting change requires seamless integration of multiple browsing devices and online software which drives end user connectivity through choice.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the presently claimed invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside on a web server, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside on a server in the "cloud". The ASIC may reside in a user terminal. Alternatively, the processor and the storage medium may reside as discrete components in a user terminal.

The previous description of the disclosed embodiments is provided to enable any person skilled in the art to make or use the presently claimed invention. Various modifications to these embodiments will be readily apparent to those skilled in the art, and the generic principles defined herein may be applied to other embodiments without departing from the spirit or scope of the presently claimed invention. Thus, the presently claimed invention is not intended to be limited to the embodiments shown herein but is to be accorded the widest scope consistent with the principles and novel features disclosed herein.

Although the presently claimed invention has been described in detail with particular reference to these preferred embodiments, other embodiments can achieve the same results. Variations and modifications of the presently claimed invention will be obvious to those skilled in the art and it is intended to cover in all such modifications and equivalents. The entire disclosures of all references, applications, patents, and publications cited above, are hereby incorporated by reference.

What is claimed is:

1. A method to incorporate at least one online media player and recorder to create subliminal affirmations for playback in parallel with at least one multimedia file, the method comprising the steps of:
   providing to a plurality of web browser users access to an interoperable and interactive digital online system to incorporate the at least one online media player and recorder to create subliminal affirmations for playback in parallel with the at least one multimedia file;
   providing the at least one multimedia file;
   providing an affirmation file;
   providing a beta brain wave file;
   harmonizing the affirmation file with the beta brain wave file;
   blending the harmonized affirmation file with the beta brain wave file to produce a subliminal affirmation file;
   synchronizing the subliminal affirmation file with the at least one multimedia file; and
   downloading and playing back the synchronized subliminal affirmation file with the at least one multimedia file.

2. The method of claim 1 wherein the multimedia file comprises a member from the group consisting of a video file, an audio file and an audio/video file.

3. The method of claim 1 wherein the at least one media file comprises an online multimedia file.

4. The method of claim 1 wherein the step of harmonizing comprises harmonizing a file format.

5. The method of claim 1 wherein the subliminal affirmation fit comprises a separate single file.

6. The method of claim wherein the step of synchronizing comprises synchronizing a timing of the subliminal affirmation file with the at least one multimedia file for playing back in parallel.

7. The method of claim 1 further comprising the step of saving the synchronized subliminal affirmation file and the at least one multimedia file.

8. A system for incorporating at least one online media player and recorder to create subliminal affirmations for playback in parallel with the at least one multimedia file comprising:
   a processor;
   means for providing a web browser to an interoperable and interactive digital online system to incorporate the at least one online media player and recorder to create subliminal affirmations for playback in parallel with the at least one multimedia file;

means for providing the at least one multimedia file in the processor;
means for providing a affirmation file to the processor;
means for a beta brain wave file to the processor;
means for harmonizing the affirmation file with the beta brain wave file in the processor;
means for blending the harmonized affirmation file with the beta brainwave file to produce a subliminal affirmation file in the processor;
means for synchronizing the subliminal affirmation file with the at least one multimedia file; and
means for downloading and playing the synchronized subliminal affirmation file with the at least one multimedia file.

9. The system of claim 8 wherein the multimedia file comprises a member from the group consisting of a video file, an audio file and an audio/video file.

10. The system of claim 8 wherein the at least one media file comprises an online multimedia file.

11. The system of claim 8 wherein the mean for harmonizing comprises a means for harmonizing a file format.

12. The system of claim 8 wherein the subliminal affirmation file comprises a separate single file.

13. The system of claim 8 wherein the means for synchronizing comprises a means for synchronizing a timing of the subliminal affirmation file with the at least one multimedia file for downloading, playing back and storing in parallel.

14. The system of claim 8 further comprising a means for saving the synchronized subliminal affirmation file and the at least one multimedia file.

15. A non-transitory storage media comprising program instructions which are computer-executable to implement an incorporation of at least one online multimedia player and recorder to create subliminal affirmations for playback in parallel with at least one multimedia file, the storage media comprising:
program instructions that cause access of a web browser to an interoperable and interactive digital online system to incorporate the at least one online media player and recorder to create subliminal affirmations for playback in parallel with the at least one multimedia file be provided;
program instructions that cause at the at least one multimedia file be provided;
program instructions that cause an affirmation file be provided;
program instructions that cause a beta brain wave file be provided;
program instructions that cause a harmonization of the affirmation file with the beta brain wave file;
program instructions that cause the harmonized affirmation file with the beta brainwave file be blended to produce a subliminal affirmation file;
program instructions that cause a synchronization of the subliminal affirmation file with the at least one multimedia file and saved; and
program instructions that cause the synchronized subliminal affirmation file with the at least one multimedia file to be downloaded and played back.

16. The non-transitory storage media of claim 15 wherein the multimedia file comprises a member from the group consisting of a video file, an audio file and an audio/video file.

17. The non-transitory storage media of claim 15 wherein the at least one multimedia file comprises an online multimedia file.

18. The non-transitory storage media of claim 15 wherein the program instructions that cause a harmonization comprises program instructions that cause a harmonization of a file format.

19. The non-transitory storage media of claim 15 wherein the subliminal affirmation file comprises a separate single file.

20. The non-transitory storage media of claim 15 wherein the program instructions that cause a synchronization comprises program instructions that cause a synchronization of a timing of the subliminal affirmation file with the at least one multimedia file for downloading, playing back and storing in parallel.

* * * * *